United States Patent
Kim et al.

(10) Patent No.: US 10,511,422 B2
(45) Date of Patent: Dec. 17, 2019

(54) METHOD AND TERMINAL FOR TRANSMITTING REFERENCE SIGNAL IN D2D COMMUNICATION

(71) Applicant: LG ELECTRONICS INC., Seoul (KR)

(72) Inventors: Youngtae Kim, Seoul (KR); Hyukjin Chae, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/759,097

(22) PCT Filed: Oct. 4, 2016

(86) PCT No.: PCT/KR2016/011049
§ 371 (c)(1),
(2) Date: Mar. 9, 2018

(87) PCT Pub. No.: WO2017/057987
PCT Pub. Date: Apr. 6, 2017

(65) Prior Publication Data
US 2018/0302202 A1    Oct. 18, 2018

Related U.S. Application Data

(60) Provisional application No. 62/236,132, filed on Oct. 1, 2015, provisional application No. 62/251,668, filed (Continued)

(51) Int. Cl.
*H04H 20/71*    (2008.01)
*H04L 5/00*    (2006.01)
(Continued)

(52) U.S. Cl.
CPC .......... *H04L 5/0048* (2013.01); *H04L 5/0051* (2013.01); *H04L 5/0053* (2013.01); *H04L 27/2602* (2013.01); *H04W 92/18* (2013.01)

(58) Field of Classification Search
None
See application file for complete search history.

(56) References Cited

U.S. PATENT DOCUMENTS

2017/0188391 A1*    6/2017    Rajagopal ......... H04W 74/0816
2018/0167184 A1*    6/2018    Zhou .................... H04L 5/0048
(Continued)

FOREIGN PATENT DOCUMENTS

WO    2015021185    2/2015
WO    2015137687    9/2015

OTHER PUBLICATIONS

U.S. Appl. No. 62/204,215; Khoryaev, "Enhanced Signal Transmission Method for LTE V2V Operation". (Year: 2015).*
(Continued)

*Primary Examiner* — Kwang B Yao
*Assistant Examiner* — Juvena W Loo
(74) *Attorney, Agent, or Firm* — Lee, Hong, Degerman, Kang & Waimey

(57) ABSTRACT

Suggested is a method for transmitting a reference signal in a device-to-device (D2D) communication. A terminal according to the present invention may transmit a physical sidelink broadcast channel (PSBCH) in which a reference signal is mapped to at least three symbols. The reference signal comprises a demodulation reference signal (DMRS), and may be mapped to orthogonal frequency division multiplexing (OFDM) symbols #4, #6 and #9.

10 Claims, 25 Drawing Sheets

Related U.S. Application Data on Nov. 5, 2015, provisional application No. 62/252,405, filed on Nov. 6, 2015, provisional application No. 62/256,050, filed on Nov. 16, 2015, provisional application No. 62/295,459, filed on Feb. 15, 2016, provisional application No. 62/299,495, filed on Feb. 24, 2016.

(51) Int. Cl.
*H04W 92/18* (2009.01)
*H04L 27/26* (2006.01)

(56) References Cited

U.S. PATENT DOCUMENTS

| | | | |
|---|---|---|---|
| 2018/0199298 A1* | 7/2018 | Wakabayashi | H04W 56/0015 |
| 2018/0199299 A1* | 7/2018 | Wakabayashi | H04W 56/002 |
| 2018/0212733 A1* | 7/2018 | Khoryaev | H04L 5/0051 |
| 2018/0241508 A1* | 8/2018 | Chervyakov | H04L 5/0051 |
| 2018/0270776 A1* | 9/2018 | Yasukawa | H04W 56/0025 |
| 2018/0279242 A1* | 9/2018 | Kwak | H04L 5/0048 |
| 2018/0332491 A1* | 11/2018 | Eckardt | H04L 5/0051 |

OTHER PUBLICATIONS

PCT International Application No. PCT/KR2016/011049, Written Opinion of the International Searching Authority dated Jan. 17, 2017, 18 pages.
ZTE, "Synchronization enhancement for V2V", 3GPP TSG RAN WG1 Meeting #82bis, R1-155234, Oct. 2015, 7 pages.
Huawei, et al., "DMRS enhancement for V2V", 3GPP TSG RAN WG1 Meeting #82bis, R1-155646, Oct. 2015, 4 pages.
ETRI, "Considerations on enhanced DMRS for V2V", 3GPP TSG RAN WG1 Meeting #82bis, R1-155840, Oct. 2015, 2 pages.
European Patent Office Application Serial No. 16852133.4, Search Report dated Apr. 25, 2019, 9 pages.
Huawei, et al., "DMRS enhancement for V2V", 3GPP TSG RAN WG1 Meeting #82, R1-153801, XP051039344, Aug. 2015, 4 pages.

* cited by examiner

METHOD AND TERMINAL FOR TRANSMITTING REFERENCE SIGNAL IN D2D COMMUNICATION

CROSS-REFERENCE TO RELATED APPLICATIONS

This application is the National Stage filing under 35 U.S.C. 371 of International Application No. PCT/KR2016/011049, filed on Oct. 4, 2016, which claims the benefit of U.S. Provisional Application No. 62/236,132, filed on Oct. 1, 2015, 62/251,668, Nov. 5, 2015, 62/252,405, filed Nov. 6, 2015, 62/256,050, filed on Nov. 16, 2015, 62/295,459, filed on Feb. 15, 2016 and 62/299,495, filed on Feb. 24, 2016, the contents of which are all hereby incorporated by reference herein in their entirety.

TECHNICAL FIELD

The present invention relates to a wireless communication system, and more particularly, to a method and terminal for transmitting a reference signal in device-to-device (D2D) and/or vehicle-to-something (V2X) communication.

BACKGROUND ART

According to intelligent transportation systems (ITS), many ongoing efforts are made to research and develop methods for exchanging various informations such as real-time traffic information and/or safety warning between vehicles. For example, ongoing efforts are made to research and develop vehicle communications for a proximity service (ProSe) and a public warning system. A communication interface for a vehicle can be commonly called V2X (vehicle-to-x). V2X communication may be categorized into V2V (vehicle-to-vehicle) communication, V2P (vehicle-to-pedestrian) communication, and V2I (vehicle-to-infrastructure entity) communication. V2V communication may refer to communication between vehicles. V2P communication may refer to communication between a vehicle and a personally carried device (e.g., a handheld terminal of a pedestrian or a bicycle rider). And, V2I communication may refer to communication between a vehicle and a roadside unit (RSU). RSU may refer to a traffic infrastructure entity. For example, RSU may include an entity that transmits a speed notification. For V2X communication, a vehicle, an RSU and a handheld device may be equipped with a transceiver.

As describe above, V2X communication may be used to indicate warnings for various events such as safety and the like. For example, information on an event occurring on a vehicle or road may be notified to another vehicle or pedestrians through V2X communication. For example, information on a warning of a traffic accident, a road situation change, or an accident danger may be forwarded to another vehicle or pedestrian. For example, a pedestrian, who is adjacent to or crossing a road, can be informed of information on vehicle approach.

However, since a vehicle moves at higher speed than a pedestrian, the V2X communication may have relatively low reliability. For example, a phase may be sharply changed due to the Doppler effect. In addition, a channel state may also be changed rapidly due to vehicle movement. Hence, to cope with the rapidly changed channel state, a method capable of achieving high reliability of communication is required.

The present invention is proposed to solve the above-described problems, and particularly, the invention discloses a method for ensuring stable communication in various types of communication including V2X communication.

DISCLOSURE OF THE INVENTION

Technical Task

The object of the present invention is to provide a method and apparatus for transmitting a reference signal for frequency offset adjustment in D2D and/or V2X communication.

Technical Solutions

To achieve these objects and other advantages, in an aspect of the present invention, provided herein is a method for transmitting a reference signal by a user equipment (UE), including transmitting a physical sidelink broadcast channel (PSBCH) including the reference signal in a subframe. In this case, the subframe may include 14 symbols in a time domain, the symbols may be indexed from 0 to 13, and the reference signal may be mapped to three symbols among the symbols.

Preferably, the reference signal may be mapped to symbols 4, 6, and 9.

Preferably, the reference signal may be a demodulation reference signal (DMRS).

Preferably, the PSBCH may further include a synchronization signal, and the synchronization signal may include a primary sidelink synchronization signal (PSSS) and a secondary sidelink synchronization signal (SSSS).

Additionally, the PSSS may be mapped to symbols 1 and 2, and the SSSS may be mapped to symbols 11 and 12.

Preferably, symbols 0 and 13 may be used for automatic gain control (AGC) or Rx-Tx switching.

Preferably, the UE may be a UE included or placed in a vehicle.

In another aspect of the present invention, provided herein is a user equipment (UE), including: a transceiver configured to transmit and receive a radio signal; and a processor configured to control the transceiver. In this case, the processor may be further configured to transmit a physical sidelink broadcast channel (PSBCH) including the reference signal in a subframe. The subframe may include 14 symbols in a time domain, the symbols may be indexed from 0 to 13, and the reference signal may be mapped to three symbols among the symbols.

Advantageous Effects

According to the present invention, it is possible to adjust a frequency offset efficiently in D2D and/or V2X communication The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention.

BEST MODE FOR INVENTION

Figure 1:
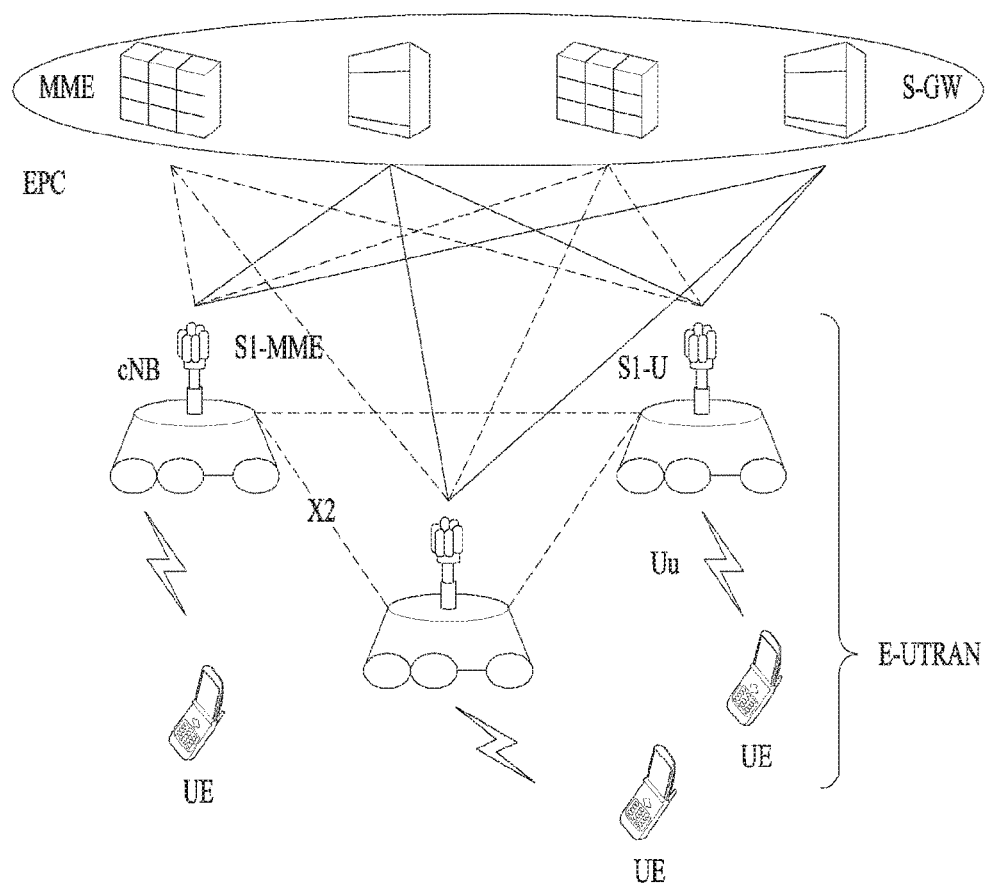
FIG. 1 shows a system architecture of an LTE system which is an example of a wireless communication system.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

It will be apparent that various operations performed for communication with the user equipment UE in the network which includes a plurality of network nodes along with the base station may be performed by the base station BS or network nodes other than the base station BS. At this time, the base station BS may be replaced with terms such as a fixed station, Node B, eNode B (eNB), and an access point (AP). A relay node may be replaced with terms such as a relay node (RN) and a relay station (RS). Also, a terminal may be replaced with terms such as a user equipment (UE), a mobile station (MS), a mobile subscriber station (MSS), and a subscriber station (SS).

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE system. WiMAX may be described by the IEEE 802.16e standard (WirelessMAN-OFDMA Reference System) and the advanced IEEE 802.16m standard (WirelessMAN-OFDMA Advanced system). Although the following description will be based on the 3GPP LTE system and the 3GPP LTE-A system to clarify description, it is to be understood that technical spirits of the present invention are not limited to the 3GPP LTE and the 3GPP LTE-A system.

LTE System Architecture

The architecture of an LTE system, which is an example of a wireless communication system to which the present invention is applicable, will be described with reference to FIG. 1. The LTE system is a mobile communication system that has evolved from UMTS. As shown in FIG. 1, the LTE system architecture may be broadly divided into an Evolved UMTS Terrestrial Radio Access Network (E-UTRAN) and an Evolved Packet Core (EPC). The E-UTRAN includes a user equipment (UE) and an Evolved NodeB (eNB). An interface between a UE and an eNB is referred to as a Uu interface, and an interface between eNBs is referred to as an X2 interface. The EPC includes a mobility management entity (MME) functioning as the control plane and a serving gateway (S-GW) functioning as the user plane. An interface between an eNB and an MME is referred to as an S1-MME interface, and an interface between an eNB and an S-GW is referred to as an S1-U interface, and the two interfaces may also be called an S1 interface.

Figure 2:
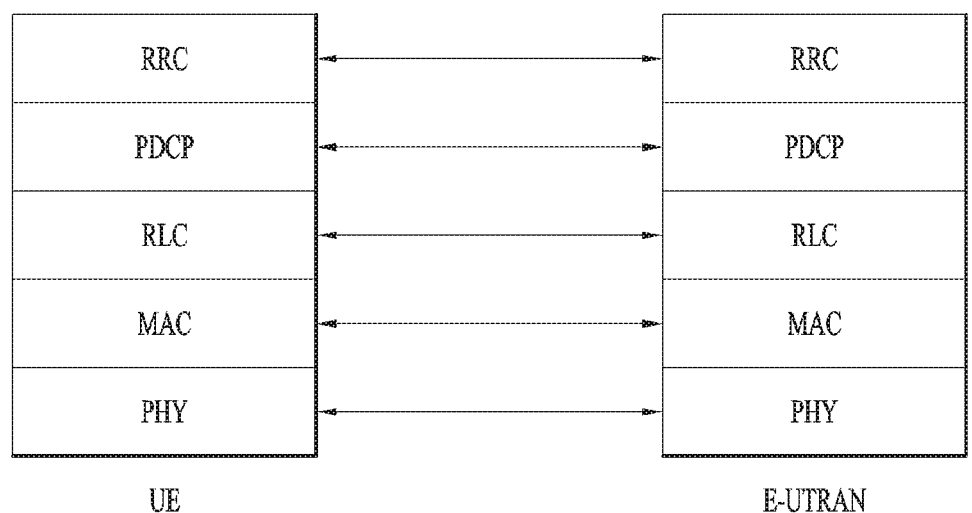
FIG. 2 illustrates a control plane of a radio protocol.
Figure 3:
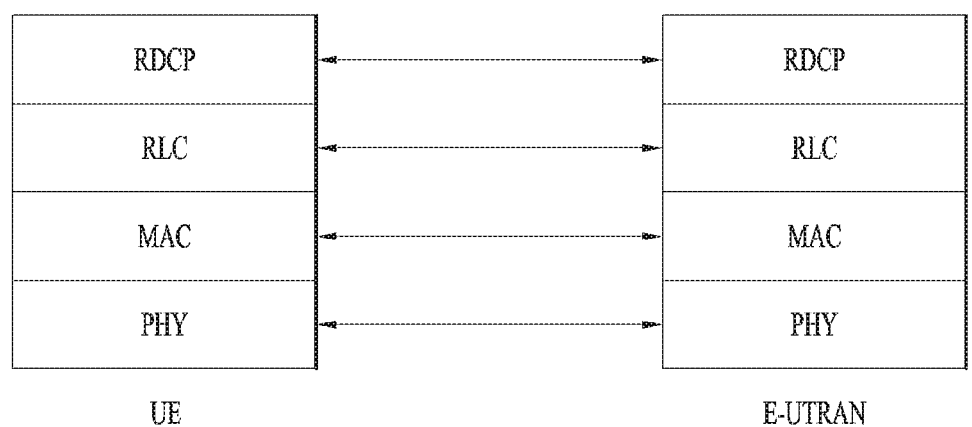
FIG. 3 illustrates a user plane of a radio protocol.

A radio interface protocol is defined in the Uu interface which is a radio section, wherein the radio interface protocol is horizontally comprised of a physical layer, a data link layer and a network layer, and vertically divided into a user plane for user data transmission and a control plane for signaling (control signal) transfer. Such a radio interface protocol may be typically classified into L1 (first layer) including a PHY which is a physical layer, L2 (second layer) including Media Access Control (MAC)/Radio Link Control (RLC)/Packet Data Convergence Protocol (PDCP) layers, and L3 (third layer) including a Radio Resource Control (RRC) layer as illustrated in FIGS. 2 and 3, based on the three lower layers of the Open System Interconnection (OSI) reference model widely known in the field of communication systems. These layers exist as a pair in the UE and E-UTRAN, and are responsible for data transmission of the Uu interface.

Hereinafter, each layer of a radio protocol shown in FIGS. 2 and 3 is described. FIG. 2 illustrates a control plane of a radio protocol, and FIG. 3 illustrates a user plane of a radio protocol.

The physical (PHY) layer serving as the first layer (L1) provides an information transfer service for a higher layer using a physical channel. The PHY layer is connected to the Media Access Control (MAC) layer serving as a higher layer over a transport channel. Through the transport channel, data is transferred from the MAC layer to the physical layer and vice versa. In this case, the transport channel is broadly divided into a dedicated transport channel and a common transport channel depending on whether or not the channel is shared. In addition, data is transferred between different PHY layers, i.e., between a PHY layer of a transmitter and a PHY layer of a receiver over a physical channel using radio resources.

There are various layers in the second layer. The MAC layer serves to map various logical channels to various transport channels and to perform logical channel multiplexing of mapping a plurality of logical channels to one transport channel. The MAC layer is connected to the Radio Link Control (RLC) layer, which is a higher layer, through a logical channel. The logical channel is broadly divided into a control channel for transmitting information on the control plane and a traffic channel for transmitting information on the user plane according to the type of information to be transmitted.

The RLC layer of the L2 segments and concatenates data received from a higher layer to adjust the data size such that the data is suitable for a lower layer to transmit the data in a radio section. To ensure various QoS levels required by various radio bearers (RBs), the RLC layer provides three RLC modes, namely, Transparent Mode (TM), Unacknowledged Mode (UM), and Acknowledged Mode (AM). Particularly, the AM RLC performs a retransmission function using an Automatic Repeat and Request (ARQ) function so as to implement reliable data transmission.

In order to efficiently transmit IP packets such as IPv4 or IPv6 packets in a radio section having a narrow bandwidth, the packet data convergence protocol (PDCP) layer of the L2 performs header compression to reduce the size of an IP packet header containing relatively large and unnecessary control information. This makes it possible to transmit only necessary information in the header portion of the data, thereby increasing the transmission efficiency of the radio section. In the LTE system, the PDCP layer also performs a security function, which consists of a ciphering function to prevent a third party from intercepting data and an integrity protection function to prevent a third party from manipulating data.

The Radio Resource Control (RRC) layer located at the top of the third layer (L3) is defined only in the control plane and is responsible for control of logical, transport, and physical channels in association with configuration, reconfiguration and release of Radio Bearers (RBs). Here, the RB refers to a logical path that the L1 and L2 of the radio protocol provide for data communication between the UE and the UTRAN. Generally, configuring an RB means that a radio protocol layer and channel characteristics needed to provide a specific service are defined and detailed parameters and operation methods thereof are configured. The RB is divided into a Signaling RB (SRB) and a Data RB (DRB). The SRB is used as a transmission passage of RRC messages in the control plane, and the DRB is used as a transmission passage of user data in the user plane.

LTE/LTE-A Resource Structure/Channel

Hereinafter, a DL radio frame structure will be described with reference to FIGS. 4 and 5.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

Figure 4:
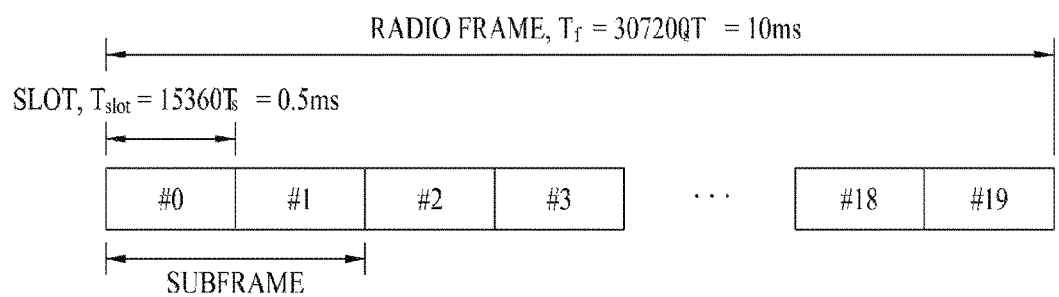
FIG. 4 illustrates the structure of a type-1 radio frame.

FIG. 4 illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

Figure 5:
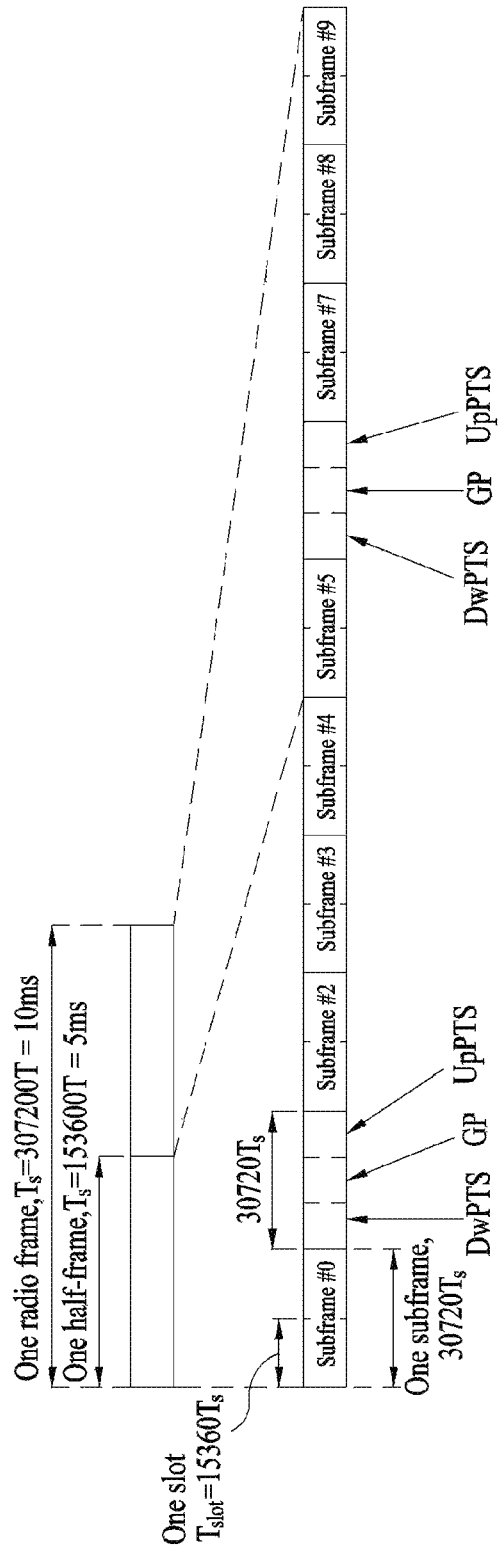
FIG. 5 illustrates the structure of a type-2 radio frame.

FIG. 5 illustrates the type-2 radio frame structure. The type-2 radio frame includes two half frames each having 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and uplink transmission synchronization in a UE. The GP is a period between a downlink and an uplink, for eliminating interference with the uplink caused by multi-path delay of a downlink signal. A subframe is composed of two slots irrespective of radio frame type.

The above-described radio frame structures are purely exemplary and thus it is to be noted that the number of subframes in a radio frame, the number of slots in a subframe, or the number of symbols in a slot may vary.

Figure 6:
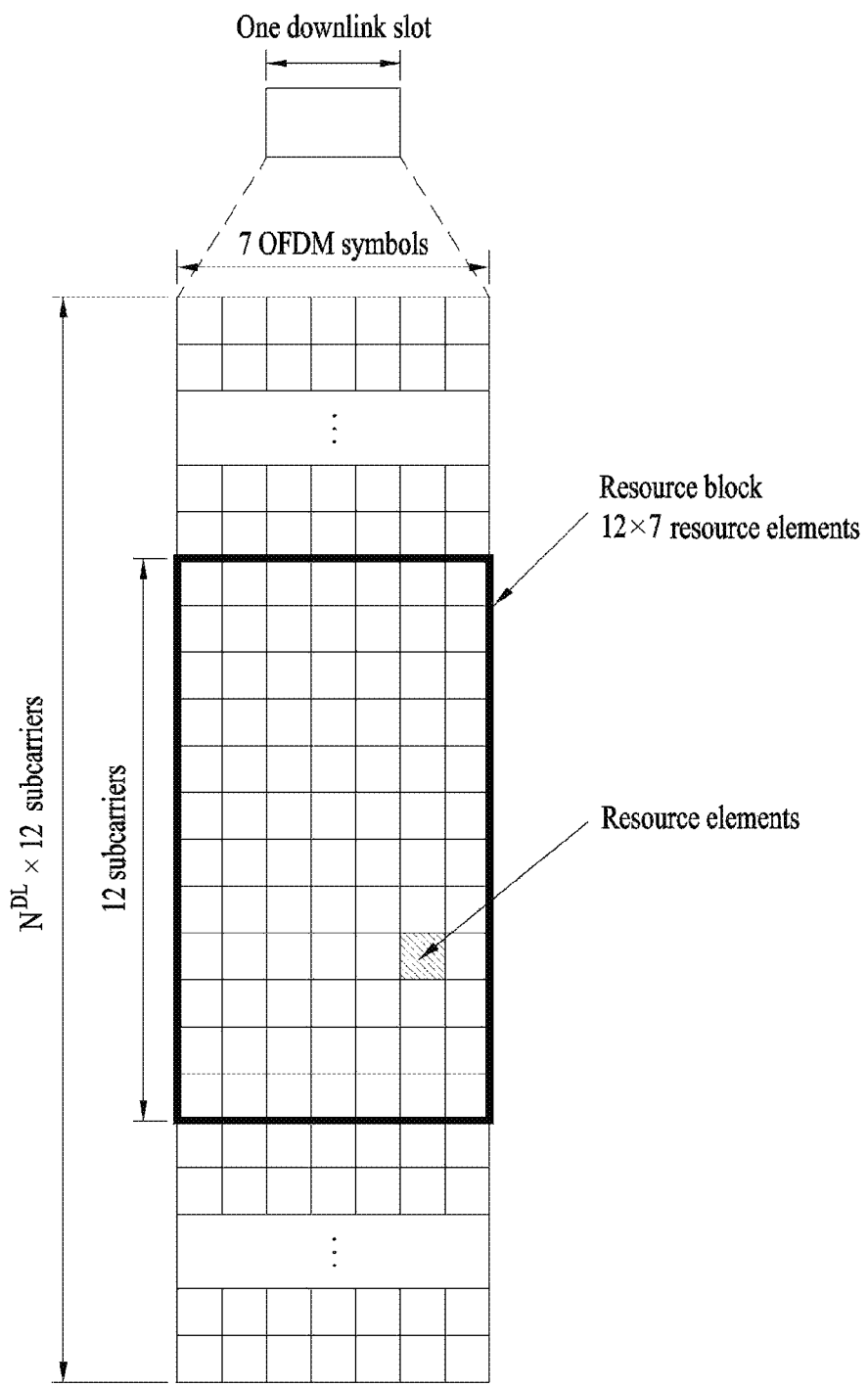
FIG. 6 illustrates a resource grid in a downlink slot.

FIG. 6 illustrates a resource grid for a downlink slot. A downlink slot includes 7 OFDM symbols in the time domain and an RB includes 12 subcarriers in the frequency domain, which does not limit the scope and spirit of the present invention. For example, a slot includes 7 OFDM symbols in the case of normal CP, whereas a slot includes 6 OFDM symbols in the case of extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 7:
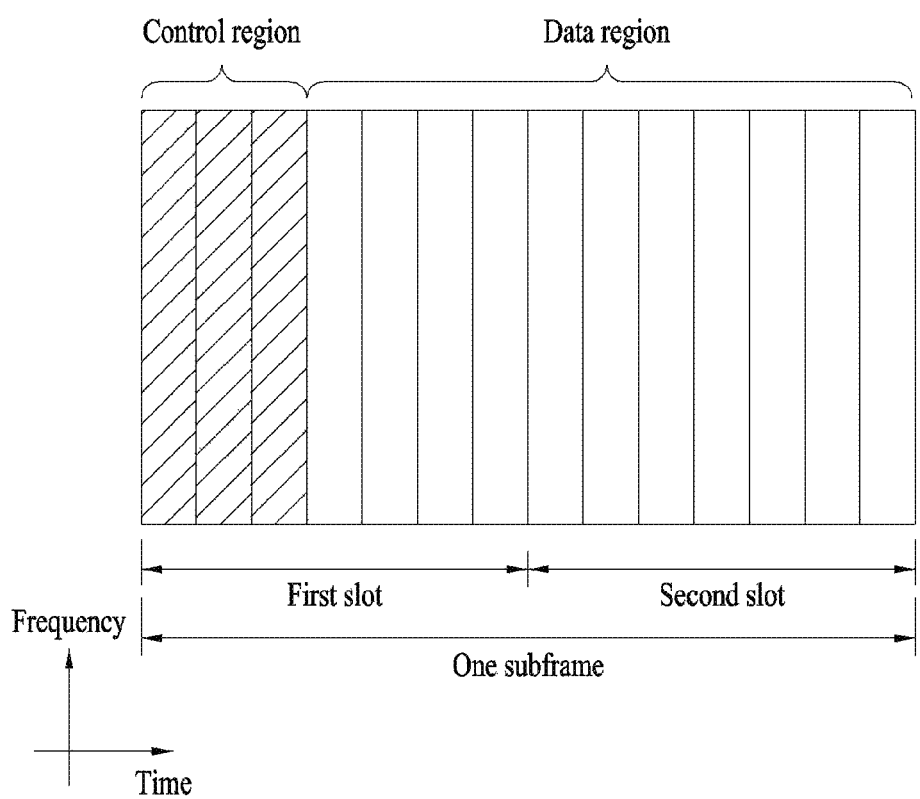
FIG. 7 illustrates a downlink subframe structure.

FIG. 7 illustrates a downlink subframe structure. Up to three OFDM symbols at the start of the first slot in a downlink subframe are used for a control region to which control channels are allocated and the other OFDM symbols of the downlink subframe are used for a data region to which a PDSCH is allocated. Downlink control channels used in 3GPP LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission. Control information carried on the PDCCH is called downlink control information (DCI). The DCI includes uplink resource allocation information, downlink resource allocation information or an uplink transmit (Tx) power control command for an arbitrary UE group. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel A CCE corresponds to a plurality of REs. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 8:
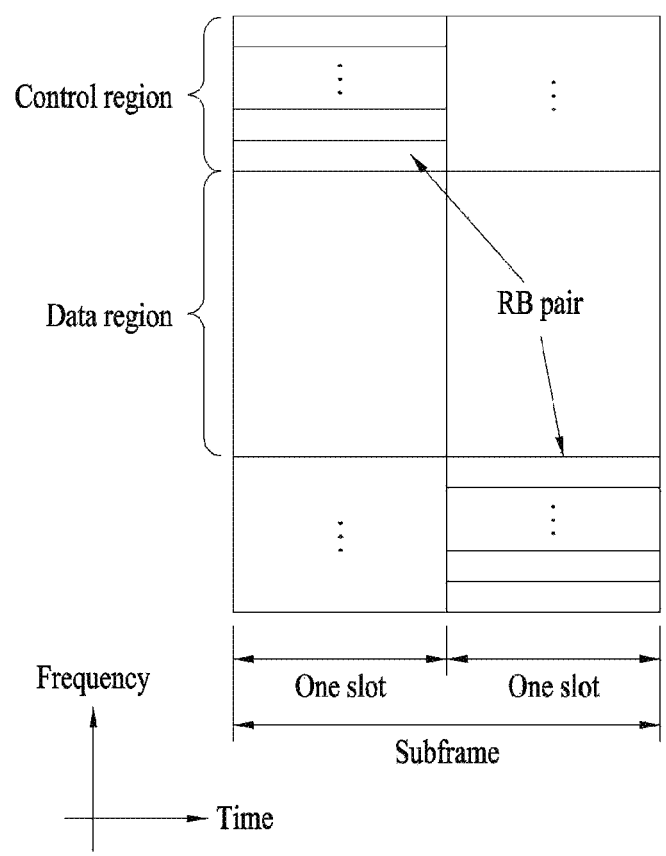
FIG. 8 illustrates an uplink subframe structure.

FIG. 8 illustrates an uplink subframe structure. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

To receive a signal from an eNB or transmit a signal to the eNB, a UE should match its time/frequency synchronization with that of the eNB. This is because only when the UE is synchronized with the eNB, the UE can determine time and frequency parameters required to perform demodulation of a DL signal and transmission of a UL signal at the exact time.

Figure 9:
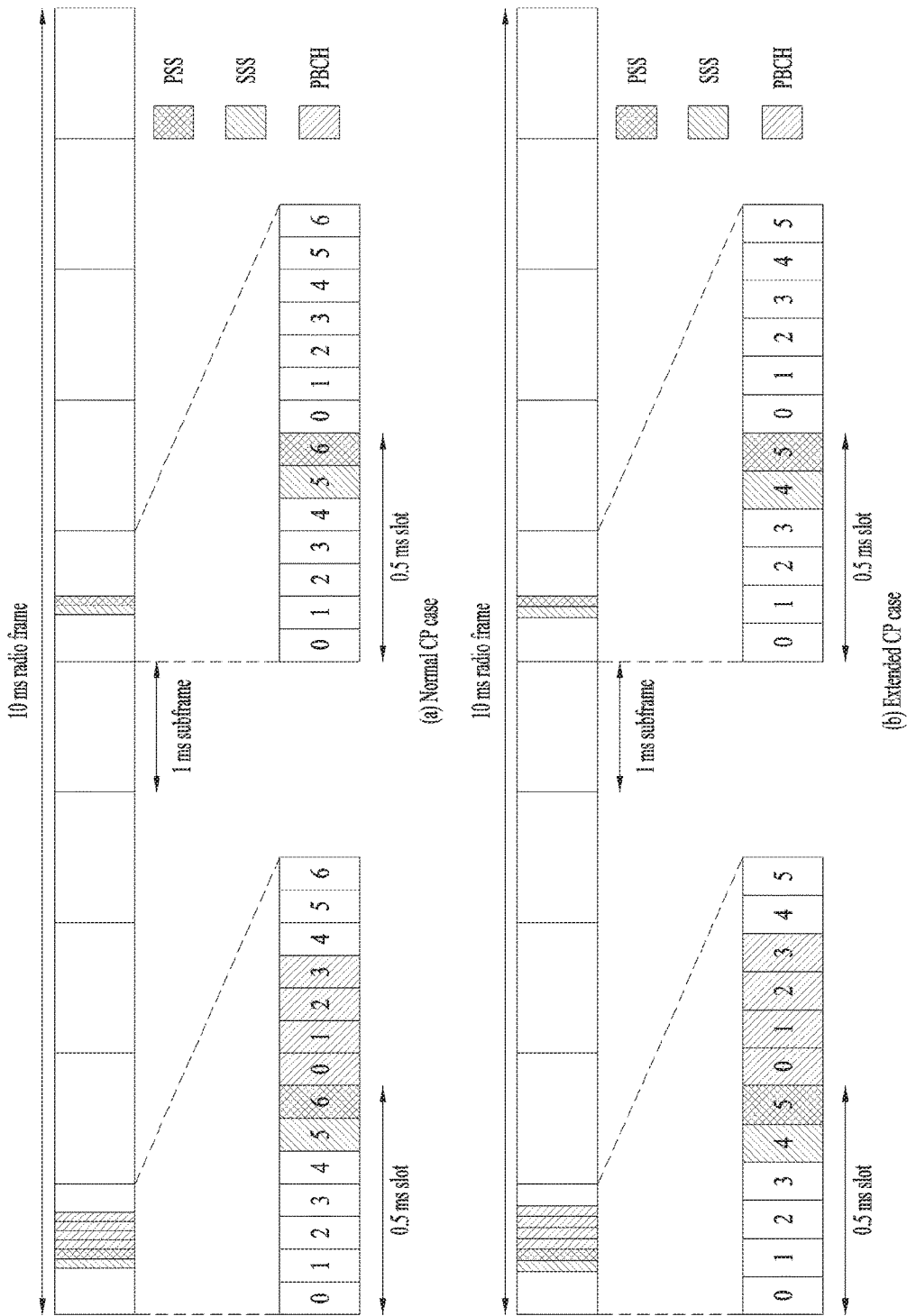
FIG. 9 illustrates a radio frame structure for transmission of a synchronization signal (SS).

FIG. 9 illustrates a radio frame structure for transmission of a synchronization signal (SS). Specifically, FIG. 9 illustrates a radio frame structure for transmission of an SS and a PBCH in frequency division duplex (FDD), wherein FIG. 9(*a*) illustrates transmission locations of an SS and a PBCH in a radio frame configured as a normal cyclic prefix (CP) and FIG. 9(*b*) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

The SS will be described in detail with reference to FIG. 9. The SS is categorized as a PSS and an SSS. The PSS is used to acquire time-domain synchronization and/or frequency-domain synchronization such as OFDM symbol synchronization, slot synchronization, etc. The SSS is used to acquire frame synchronization, a cell group ID, and/or a cell's CP configuration (i.e. information indicating whether a normal CP or an extended is used). Referring to FIG. 9, the PSS and the SSS are respectively transmitted through two OFDM symbols in each radio frame. Specifically, the SS is transmitted in a first slot in each of subframe 0 and subframe 5 in consideration of a GSM (global system for mobile communication) frame length of 4.6 ms for facilitation of an inter-radio access technology (inter-RAT) measurement. In particular, the PSS is transmitted in a last OFDM symbol in each of the first slot of subframe 0 and the first slot of subframe 5. In addition, the SSS is transmitted in the second last OFDM symbol in each of the first slot of subframe 0 and the first slot of subframe 5. Boundaries of the corresponding radio frame may be detected through the SSS. The PSS is transmitted in the last OFDM symbol of the corresponding slot and the SSS is transmitted in the OFDM symbol immediately before the OFDM symbol in which the PSS is transmitted. According to a transmission diversity scheme for the SS, only a single antenna port is used. However, the transmission diversity scheme for the SS standards is not separately defined in the current standards. In other words, a single antenna port transmission scheme or a transmission scheme transparent to a UE (e.g. precoding vector switching (PVS), time switched transmit diversity (TSTD), or cyclic delay diversity (CDD)) can be adopted for transmission diversity of the SS.

The SS can represent total 504 unique physical layer cell IDs through combinations of 3 PSSs and 168 SSSs. In other words, the physical layer cell IDs are grouped into 168 physical layer cell ID groups each including three unique IDs so that each physical layer cell ID is a part of only one physical layer cell ID group. Thus, a physical layer cell ID $N_{ID}^{cell}$ is uniquely defined with a number $N_{ID}^{(1)}$ in the range of 0 to 167 indicating a physical layer cell ID group and a number $N_{ID}^{(2)}$ in the range of 0 to 2 indicating a physical layer ID in the physical layer cell ID group (i.e., $N_{ID}^{cell}=3 N_{ID}^{(1)}+N_{ID}^{(2)}$). A UE can obtain one of the three unique physical layer IDs by detecting the PSS and then identify one of the 168 physical layer cell IDs, which are associated with the physical layer ID, by detecting the SSS. A Zadoff-Chu (ZC) sequence of length 63 is defined in a frequency domain and the sequence is used as the PSS. For example, the ZC sequence can be defined according to Equation 1 below.

$$d_u(n) = e^{-j\frac{\pi un(n+1)}{N_{ZC}}}$$ [Equation 1]

In Equation 1, $N_{ZC}$ is set to 63 ($N_{ZC}=63$) and a sequence element corresponding to a DC subcarrier, n=31, is punctured.

The PSS is mapped to 6 RBs (=72 subcarriers) adjacent to a center frequency. Among the 72 subcarriers, 9 remaining subcarriers carry a value of 0 at all times and serve as elements facilitating filter design for performing synchronization. In order to define total three PSSs, u=24, u=29, and u=34 are used in Equation 1. Since u=24 and u=34 have a conjugate symmetry relation, two correlations may be simultaneously performed. In this case, the conjugate symmetry means the relationship in Equation 2 below.

$$d_u(n)=(-1)^n(d_{N_{ZC}-u}(n))^*, \text{ when } N_{ZC} \text{ is even number}$$

$$d_u(n)=(d_{N_{ZC}-u}(n))^*, \text{ when } N_{ZC} \text{ is odd number}$$ [Equation 2]

A one-shot correlator for u=29 and u=34 can be implemented using conjugate symmetry characteristics. Moreover, compared to a case without the conjugate symmetry, the total amount of calculation can be reduced by about 33.3%.

More specifically, a sequence d(n) used for the PSS can be generated from a frequency-domain ZC sequence according to Equation 3 below.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases}$$ [Equation 3]

In Equation 3, a ZC root sequence index u can be given as shown in Table 1 below.

TABLE 1

| $N_{ID}^{(2)}$ | Root index u |
| --- | --- |
| 0 | 25 |
| 1 | 29 |
| 2 | 34 |

Referring to FIG. 9, since the PSS is transmitted every 5 ms, a UE may know that a corresponding subframe is one of subframe 0 and subframe 5 by detecting the PSS. However, the UE cannot know whether the subframe is subframe 0 or subframe 5. In other words, the UE cannot recognize boundaries of a radio frame only through the PSS. That is, frame synchronization cannot be obtained only from the PSS. The UE detects the boundaries of the radio frame by detecting an SSS which is transmitted twice in one radio frame with different sequences.

Figure 10:
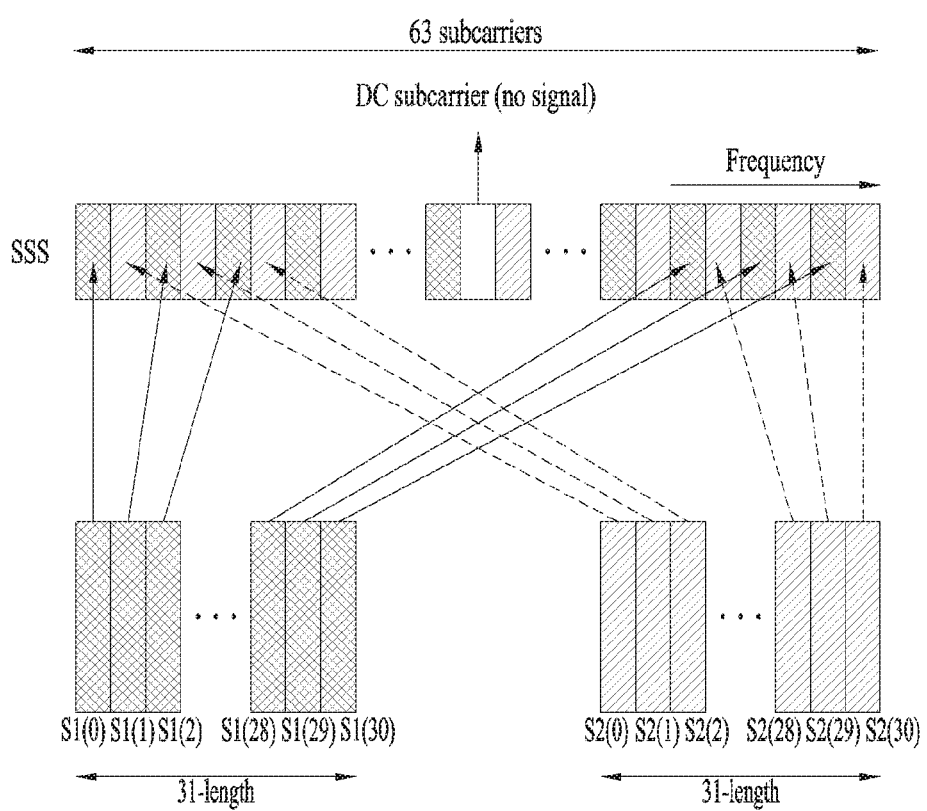
FIG. 10 is a diagram for explaining a scheme for generating a secondary synchronization signal (SSS).

FIG. 10 is a diagram for explaining a scheme of generating a secondary synchronization signal (SSS). Specifically, FIG. 10 illustrates a mapping relationship for mapping two sequences in a logical domain to a physical domain.

A sequence used for the SSS corresponds to an interleaved concatenation of two m-sequences each of length 31. The concatenated sequence is scrambled by a scrambling sequence given by the PSS. In this case, the m-sequence is a kind of a pseudo noise (PN) sequence.

Referring to FIG. 10, if two m-sequences used for generating an SSS code are denoted by S1 and S2 respectively, then two different PSS-based sequences S1 and S2 are scrambled into the SSS. In this case, S1 and S2 are scrambled by different sequences. A PSS-based scrambling code may be obtained by cyclically shifting an m-sequence generated from a polynomial of $x^5+x^3+1$. Depending on a PSS index, 6 sequences are generated by the cyclic shift of the m-sequence. Subsequently, S2 is scrambled by an S1-based scrambling code. The S1-based scrambling code may be obtained by cyclically shifting an m-sequence generated from a polynomial of $x^5+x^4+x^2+x^1+1$. Depending on an S1 index, 8 sequences are generated by the cyclic shift of the m-sequence. The SSS code is swapped every 5 ms, whereas the PSS-based scrambling code is not swapped. For example, assuming that an SSS of subframe 0 carries a cell group ID through a combination of (S1, S2), an SSS of subframe 5 carries a sequence swapped as (S2, S1). Thus, boundaries of a radio frame of 10 ms can be discerned. The SSS code used in this case is generated based on a polynomial of $x^5+x^2+1$. In addition, total 31 codes can be generated through different cyclic shifts of the m-sequence of length 31.

A combination of two m-sequences, each of which has length 31, used for defining the SSS differs in subframe 0 and subframe 5. Total 168 cell group IDs are represented according to a combination of the two m-sequences each of length 31. The m-sequences used as sequences for the SSS have a robust property in a frequency selective environment. In addition, since the m-sequences can be transformed by high-speed m-sequence transform that uses fast Hadamard transform, if the m-sequences are utilized for the SSS, the amount of calculation necessary for a UE to interpret the SSS can be reduced. Moreover, since the SSS is composed of two short codes, the amount of calculation performed by the UE can also be reduced.

Details of generation of the SSS is described hereinafter. Sequences of d(0), . . . , d(61) used for the SSS are an interleaved concatenation of two binary sequences, each of which has length 31. The concatenated sequence is scrambled by a sequence given by the PSS.

A combination of two sequences, each of which has length 31, used for defining the PSS can be differentiated in subframe 0 and subframe 5 according to Equation 4.

$$d(2n) = \begin{cases} s_0^{(m_0)}(n)c_0(n) & \text{in subframe 0} \\ s_1^{(m_1)}(n)c_0(n) & \text{in subframe 5} \end{cases}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$ [Equation 4]

In Equation 4, $0 \leq n \leq 30$. Indices $m_0$ and $m_1$ are derived from the physical layer cell identity group $N_{ID}^{(1)}$ according to Equation 5.

$$m_0 = m' \bmod 31$$
$$m_1 = (m_0 + \lfloor m'/31 \rfloor + 1) \bmod 31$$
$$m' = N_{ID}^{(1)} + \frac{q(q+1)}{2}, \; q = \left\lfloor \frac{N_{ID}^{(1)} + q'(q'+1)/2}{30} \right\rfloor,$$
$$q' = \lfloor N_{ID}^{(1)}/30 \rfloor$$ [Equation 5]

The output in Equation 5 will be listed in Table 2 after Equation 11.)

Two sequences $S_0^{(m_0)}(n)$ and $S_1^{(m_1)}(n)$ are defined as two different cyclic shifts of an m-sequence s(n) according to Equation 6.

$$s_0^{(m_0)}(n) = s((n+m_0) \bmod 31)$$
$$s_1^{(m_1)}(n) = s((n+m_1) \bmod 31)$$ [Equation 6]

In Equation 6, $s(i) = 1 - 2x(i)$ (where $0 \leq i \leq 30$) is defined according to Equation 7 with initial conditions of $x(0)=0$, $x(1)=0$, $x(2), x(3)=0$, and $x(4)=1$.

$$x(\bar{i}+5) = (x(\bar{i}+3) + x(\bar{i})) \bmod 2, \; 0 \leq \bar{i} \leq 25$$ [Equation 7]

Two scrambling sequences $c_0(n)$ and $c_1(n)$ depend on the PSS and are defined by two different cyclic shifts of an m-sequence c(n) according to Equation 8.

$$c_0^{(n)} = c((n+N_{ID}^{(2)}) \bmod 31)$$
$$c_1^{(n)} = c((n+N_{ID}^{(2)}+3) \bmod 31)$$ [Equation 8]

In Equation 8, $N_{ID}^{(2)} \in \{0, 1, 2\}$ is a physical layer identity in the physical layer cell identity group $N_{ID}^{(1)}$ and $c(i) = 1 - 2x(i)$ (where $0 \leq i \leq 30$) is defined according to Equation 9 with initial conditions of $x(0)=0$, $x(1)=0$, $x(2), x(3)=0$, and $x(4)=1$.

$$x(\bar{i}+5) = (x(\bar{i}+3) + x(\bar{i})) \bmod 2, \; 0 \leq \bar{i} \leq 25$$ [Equation 9]

Scrambling sequences $Z_1^{(m_0)}(n)$ and $Z_1^{(m_1)}(n)$ are defined by cyclic shifts of an m-sequence z(n) according to Equation 10.

$$z_1^{(m_0)}(n) = z((n+(m_0 \bmod 8)) \bmod 31)$$
$$z_1^{(m_1)}(n) = z((n+(m_1 \bmod 8)) \bmod 31)$$

In Equation 10, $m_0$ and $m_1$ are obtained from Table 2 after Equation 11 and $z(i) = 1 - 2x(i)$ (where $0 \leq i \leq 30$) is defined according to Equation 11 with initial conditions of $x(0)=0$, $x(1)=0$, $x(2), x(3)=0$, and $x(4)=1$.

$$x(\bar{i}+5) = (x(\bar{i}+4) + x(\bar{i}+2) + x(\bar{i}+1) + x(\bar{i})) \bmod 2, \; 0 \leq \bar{i} \leq 25$$ [Equation 11]

TABLE 2

| $N_{ID}^{(1)}$ | $m_0$ | $m_1$ | $N_{ID}^{(1)}$ | $m_0$ | $m_1$ | $N_{ID}^{(1)}$ | $m_0$ | $m_1$ | $N_{ID}^{(1)}$ | $m_0$ | $m_1$ | $N_{ID}^{(1)}$ | $m_0$ | $m_1$ | $N_{ID}^{(1)}$ | $m_0$ | $m_1$ |
|---|---|---|---|---|---|---|---|---|---|---|---|---|---|---|---|---|---|
| 0 | 0 | 1 | | | | 0 | 1 | | | 0 | 1 | | | 0 | 1 | | | 0 | 1 |
| | | 4 | | | 8 | 2 | 02 | 5 | 9 | 36 | 2 | 7 |
| | | 5 | | 9 | 0 | 3 | 03 | 6 | 0 | 37 | 3 | 8 |
| | | 6 | | 0 | 1 | 4 | 04 | 7 | 1 | 38 | 4 | 9 |
| | | 7 | | 1 | 2 | 5 | 05 | 8 | 2 | 39 | 5 | 0 |
| | | 8 | 0 | 2 | 3 | 6 | 06 | 9 | 3 | 40 |
| | | 9 | 1 | 3 | 4 | 7 | 07 | 0 | 4 | 41 |
| | 0 | 0 | 2 | 4 | 5 | 8 | 08 | 1 | 5 | 42 |
| | 1 | 1 | 3 | 5 | 6 | 9 | 09 | 2 | 6 | 43 |
| | 2 | 2 | 4 | 6 | 7 | 0 | 10 | 3 | 7 | 44 | | | 0 |
| | 0 | 3 | 3 | 5 | 7 | 8 | 1 | 11 | 4 | 8 | 45 | | | 1 |
| 0 | 0 | 1 | 4 | 4 | 6 | 8 | 9 | 2 | 12 | 5 | 9 | 46 | | | 2 |
| 1 | 1 | 2 | 5 | 5 | 7 | 9 | 0 | 3 | 13 | 6 | 0 | 47 | | | 3 |
| 2 | 2 | 3 | 6 | 6 | 8 | 0 | 1 | 4 | 14 | | | 48 | | | 4 |
| 3 | 3 | 4 | 7 | 7 | 9 | 1 | 2 | 5 | 15 | | | 49 | | | 5 |
| 4 | 4 | 5 | 8 | 8 | 0 | 2 | 3 | 6 | 16 | | | 50 | 0 | 6 |
| 5 | 5 | 6 | 9 | 9 | 1 | 3 | 4 | 7 | 17 | | | 51 | 1 | 7 |
| 6 | 6 | 7 | 0 | 0 | 2 | 4 | 5 | 8 | 18 | | | 52 | 2 | 8 |
| 7 | 7 | 8 | 1 | 1 | 3 | 5 | 6 | 9 | 19 | | | 0 | 53 | 3 | 9 |
| 8 | 8 | 9 | 2 | 2 | 4 | 6 | 7 | 0 | 20 | | | 1 | 54 | 4 | 0 |
| 9 | 9 | 0 | 3 | 3 | 5 | 7 | | | 21 | | | 2 | 55 | 5 | 1 |
| 0 | 0 | 1 | 4 | 4 | 6 | 8 | | | 22 | | | 3 | 56 | 6 | 2 |
| 1 | 1 | 2 | 5 | 5 | 7 | 9 | | | 23 | | | 4 | 57 | 7 | 3 |
| 2 | 2 | 3 | 6 | 6 | 8 | 0 | | | 24 | 0 | 5 | 58 | 8 | 4 |
| 3 | 3 | 4 | 7 | 7 | 9 | 1 | | | 25 | 1 | 6 | 59 | 9 | 5 |
| 4 | 4 | 5 | 8 | 8 | 0 | 2 | | | 26 | 2 | 7 | 60 | 0 | 6 |
| 5 | 5 | 6 | 9 | | | 3 | | | 0 | 27 | 3 | 8 | 61 | 1 | 7 |
| 6 | 6 | 7 | 0 | | | 4 | | | 1 | 28 | 4 | 9 | 62 | 2 | 8 |
| 7 | 7 | 8 | 1 | | | 5 | | | 2 | 29 | 5 | 0 | 63 | 3 | 9 |
| 8 | 8 | 9 | 2 | | | 6 | | | 3 | 30 | 6 | 1 | 64 | 4 | 0 |
| 9 | 9 | 0 | 3 | | | 7 | 0 | 4 | 31 | 7 | 2 | 65 |
| 0 | | | 4 | | | 8 | 1 | 5 | 32 | 8 | 3 | 66 |
| 1 | | | 5 | | | 9 | 2 | 6 | 33 | 9 | 4 | 67 |
| 2 | | | 6 | | 0 | 00 | 3 | 7 | 34 | 0 | 5 |
| 3 | | | 7 | | 1 | 01 | 4 | 8 | 35 | 1 | 6 |

After determining time and frequency parameters required to demodulation of a DL signal and transmission of a UL signal at the exact time by performing a cell search procedure using the SSS, a UE can communicate with an eNB by receiving system information necessary for a system configuration of the UE from the eNB.

The system information is configured with a master information block (MIB) and system information blocks (SIBs). Each SIB includes a set of parameters which are functionally related to each other and is categorized as an MIB, SIB Type 1 (SIB1), SIB Type 2 (SIB2), and SIB3 to SIB8 according to the included parameters. The MIB includes most frequently transmitted parameters which are essential for a UE to initially access a network served by an eNB. The SIB1 includes not only information on time-domain scheduling for other SIBs but also parameters necessary to determine whether a specific cell is suitable for cell selection.

The UE may receive the MIB through a broadcast channel (e.g. a PBCH). The MIB includes a downlink system bandwidth (DL BW), a PHICH configuration, and a system frame number (SFN). Thus, the UE can explicitly know information on the DL BW, SFN, and PHICH configuration by receiving the PBCH. On the other hand, the UE may implicitly know information on the number of transmission antenna ports of the eNB. The information on the number of the transmission antennas of the eNB is implicitly signaled by masking (e.g. XOR operation) a sequence corresponding to the number of the transmission antennas to 16-bit CRC (cyclic redundancy check) used in detecting an error of the PBCH.

The PBCH is mapped to four subframes during 40 ms. The time of 40 ms is for blind detection and there is no explicit signaling for the time of 40 ms. In the time domain, the PBCH is transmitted in OFDM symbols 0 to 3 of slot 1 in subframe 0 (i.e., the second slot of subframe 0) of a radio frame.

In the frequency domain, PSS/SSS and PBCH are transmitted irrespective of an actual system bandwidth in total 6 RBs, i.e., 3 RBs in the left side and 3 RBs in the right side with reference to a DC subcarrier within a corresponding OFDM symbol. In other words, the PSS/SSS and the PBCH are transmitted only in 72 subcarriers. Therefore, a UE is configured to detect or decode the SS and the PBCH irrespective of a downlink transmission bandwidth configured for the UE.

After accessing the network served by the eNB by completing the initial cell search, the UE is able to obtain more detailed system information by receiving a PDCCH and a PDSCH according to information carried on the PDCCH. After performing the above-described procedure, the UE may perform PDCCH/PDSCH reception and PUSCH/PUCCH transmission as a general UL/DL signal transmission procedure.

Physical Broadcast Channel (PBCH) Overview

As a physical layer of the LTE system that constitutes a cell search procedure for a UE together with the PSS and SSS, the PBCH carries information such as the master information block (MIB) which all served UEs should know. That is, when obtaining synchronization from the PSS and SSS and detecting a cell identifier, a UE can receive a PBCH of the corresponding cell. This is because the PBCH is scrambled in accordance with the cell identifier.

To transmit the PBCH, different transmit diversity schemes are used depending on the number of eNB's transmit antennas. When there are two antennas, a space frequency block code (SFBC) scheme is used for the PBCH transmission. When there are four antennas, an SFBC+FSTD (frequency switching transmit diversity) scheme is used for the PBCH transmission. Thus, the UE should know the number of eNB's transmit antennas to receive the PBCH. To this end, an implicit signaling scheme is used in the LTE system. That is, the UE can perform blind detection of the number of eNB's transmit antenna using the fact that a signal varying depending on the number of antennas is masked after CRC is added to a BCH transport block.

Since the PBCH should be received by all the UEs irrespective of a transmission bandwidth, the PBCH is transmitted in 6 RBs located at the center of the system bandwidth and occupies first (or starting) 4 OFDM symbols of a second slot of a first subframe in a radio frame, which satisfies $n_f \mod 4=0$ and is consecutive to a synchronization signal (SS).

RS: Reference Signal

When a packet is transmitted in a mobile communication system, since the packet is transmitted via a radio channel, a signal may be distorted in the course of transmission. In order for a receiving end to correctly receive the distorted signal, the receiving end may correct the distortion of the transmitted signal as much as channel information by finding out the channel information. In order to find out the channel information, a signal known to both a transmitting end and the receiving end is transmitted and it may find out the channel information with the extent of distortion of the signal when the signal is received on a channel. The signal known to both the transmitting end and the receiving end is called a pilot signal or a reference signal. When wireless communication to which MIMO technique is applied is performed, a separate reference signal exists in each transmission antenna.

In a mobile communication system, a reference signal (RS) is mainly classified into two types according to a usage of the reference signal. The reference signal includes a reference signal used for obtaining channel information and a reference signal used for data demodulation. Since the former one is used for a UE to obtain the channel information in downlink, it is necessary for the RS to be transmitted by a wide band. Although a UE does not receive downlink data in a specific subframe, the UE should be able to receive and measure the RS. The RS used for obtaining the channel information can also be used for measuring handover and the like. The latter one corresponds to an RS transmitted to a corresponding resource together with a downlink resource when a base station transmits the downlink data. A UE can perform channel estimation by receiving the RS and may be then able to demodulate data. The reference signal used for data demodulation is transmitted in a region in which data is transmitted.

LTE system defines a downlink RS of two types for a unicast service. An RS is classified into a common RS (CRS) used for obtaining information on a channel state and measuring handover and the like and a UE-specific RS used for demodulating data. In LTE system, the UE-specific RS is used for modulating data only. On the contrary, the CRS is used not only for obtaining channel information but also for demodulating data. The CRS corresponds to a cell-specific signal and is transmitted in every subframe over a wide band.

In LTE-A system, a reference signal capable of supporting maximum 8 transmitting antennas is required. In order to support 8 transmitting antennas while backward compatibility with LTE system is maintained, it is necessary to additionally define RSs for maximum 8 transmission antennas in time-frequency domain in which a CRS defined in LTE is transmitted in every subframe over a whole band. If the RSs for the maximum 8 transmission antennas are added in LTE-A system using a scheme identical to the CRS of a legacy LTE, RS overhead becomes considerably big. Hence, an RS is newly designed in LTE-A to measure a channel for selecting MCS (Modulation and Coding Scheme), PMI (Precoding Matrix Indicator), and the like. The RS is mainly classified into two types including an RS (CSI-RS: channel state information-RS) and an RS (DM-RS) used for demodulating data. Unlike a legacy CRS, which is used for measuring a channel, handover and the like and demodulating data, the CSI-RS is mainly designed for the purpose of obtaining information on a channel. Since the CSI-RS is mainly transmitted to obtain information on a channel state, it is not necessary to transmit the CSI-RS in every subframe. In order to reduce overhead due to the CSI-RS, the CSI-RS is intermittently transmitted in time domain. For data demodulation, a DM-RS for a corresponding UE is transmitted. In particular, a DM-RS of a specific UE is transmitted in a region in which the specific UE is scheduled only, i.e., a time-frequency domain in which data is received by the specific UE.

Figure 11:
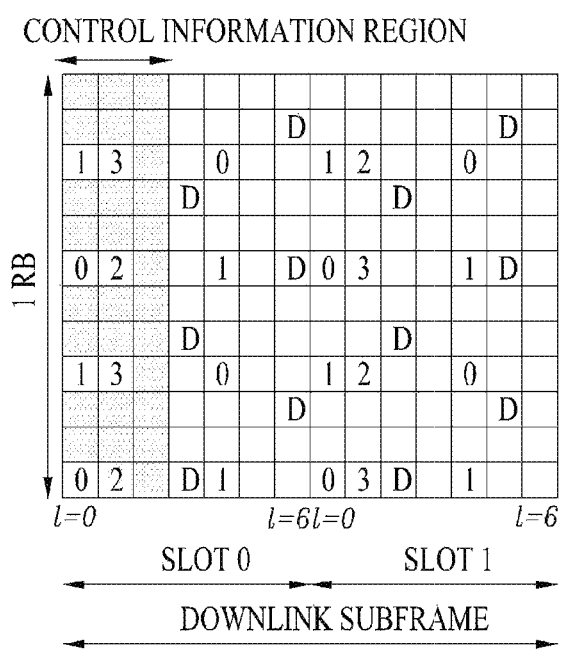
FIG. 11 is a diagram for a configuration of a downlink reference signal for a normal CP in LTE system supporting downlink transmission using 4 antennas.
Figure 12:
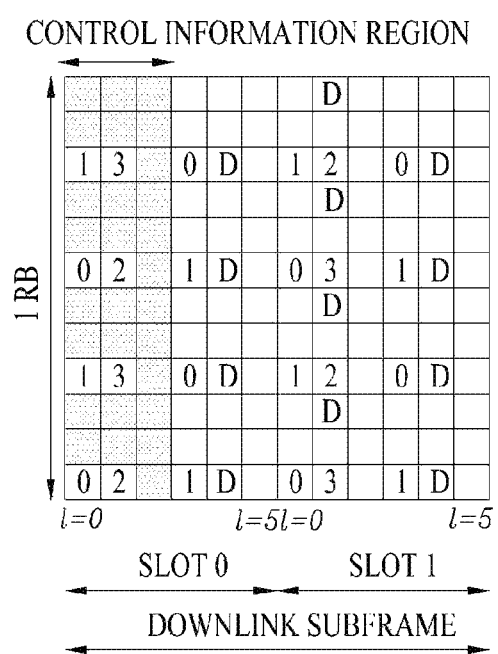
FIG. 12 is a diagram for a configuration of a downlink reference signal for an extended CP in LTE system supporting downlink transmission using 4 antennas.
Figure 13:
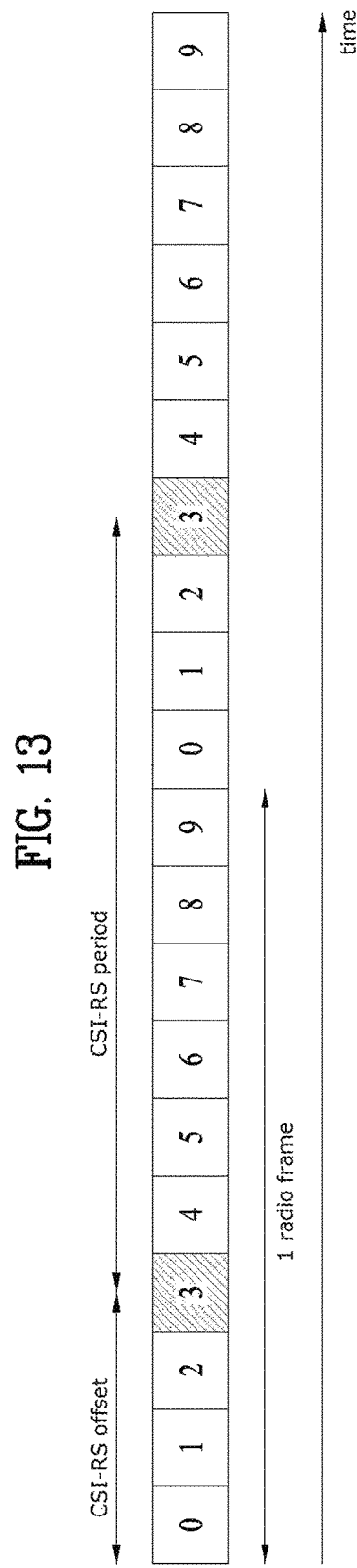
FIG. 13 is a diagram for an example of a periodic CSI-RS transmission scheme.

FIGS. 11 and 12 illustrate RS configurations in an LTE system supporting DL transmission through four antennas (4-Tx DL transmission). Specifically, FIG. 12 illustrates an RS configuration in the case of a normal CP and FIG. 13 illustrates an RS configuration in the case of an extended CP.

Referring to FIGS. 11 and 12, reference numerals 0 to 3 in grids denote cell-specific RSs, CRSs transmitted through antenna port 0 to antenna port 3, for channel measurement and data modulation. The CRSs may be transmitted to UEs across a control information region as well as a data information region.

Reference character D in grids denotes UE-specific RSs, Demodulation RSs (DMRSs). The DMRSs are transmitted in a data region, that is, on a PDSCH, supporting single-antenna port transmission. The existence or absence of a UE-specific RS, DMRS is indicated to a UE by higher-layer signaling. In FIGS. 11 and 12, the DMRSs are transmitted through antenna port 5. 3GPP TS 36.211 defines DMRSs for a total of eight antenna ports, antenna port 7 to antenna port 14.

For example, a rule of mapping an RS mapped to a resource block may follow following equations.

In case of a CRS, the CRS can be mapped according to equation 12.

$$k = 6m + (v + v_{shift}) \bmod 6 \quad \text{[Equation 12]}$$

$$l = \begin{cases} 0, N_{symb}^{DL} & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In case of a DRS (dedicated RS), the DRS can be mapped according to equation 13.

normal CP [Equation 13]

$$k = (k') \bmod N_{SC}^{RB} + N_{SC}^{RB} \cdot n_{PRB}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

Extended CP $$k = (k') \bmod N_{SC}^{RB} + N_{SC}^{RB} \cdot n_{PRB}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In equations 12 and 13, k indicates a subcarrier index and P indicates an antenna port index. And, $N_{DL}^{RB}$ indicates the number of resource blocks allocated to DL, $n_s$ indicates a slot index, and $N_{ID}^{cell}$ indicates a cell ID.

In LTE-A system, an eNB transmits a CSI-RS to all antenna ports. As mentioned in the foregoing description, a CSI-RS can be intermittently transmitted in a time axis. In particular, a CSI-RS can be periodically transmitted with an interval of integer multiple of a subframe. Or, a CSI-RS can be transmitted with a specific transmission pattern. In this case, the interval or the pattern used for transmitting a CSI-RS can be configured by an eNB. In order to measure a channel using a CSI-RS, a UE should be aware of such information as a transmission subframe index of the CSI-RS for each CSI-RS antenna port of a cell to which the UE belongs, a CSI-RS RE time-frequency position within a transmission subframe, a CSI-RS sequence, and the like.

In LTE-A system, a resource used for transmitting a CSI-RS to antenna ports different from each other should be orthogonal to each other. When an eNB transmits a CSI-RS to antenna ports different from each other, resources can be orthogonally allocated using FDM/TDM scheme in a manner of mapping a CSI-RS transmitted to each antenna port to REs different from each other. Or, a CSI-RS transmitted to antenna ports different from each other can be mapped to codes orthogonal to each other using a CDM scheme.

An example of a scheme periodically transmitting a CSI-RS is shown in FIG. 13. As shown in FIG. 13, a CSI-RS is transmitted with a period of 10 ms and a CSI-RS transmission offset corresponds to 3. An offset value may vary according to an eNB to enable CSI-RSs of many cells to be evenly distributed. In case of a CSI-RS transmitted with a period of 10 ms, an eNB may have 10 offset values ranging from 0 to 9. The offset value indicates a subframe index value where the eNB of a specific period actually starts to transmit a CSI-RS. If the eNB informs a UE of a period of a CSI-RS and an offset value, the UE measures the CSI-RS of the eNB at a corresponding position using the value and reports such information as CQI/PMI/RI and the like to the eNB. All of the aforementioned informations related to the CSI-RS correspond to cell-specific information.

Figure 14:
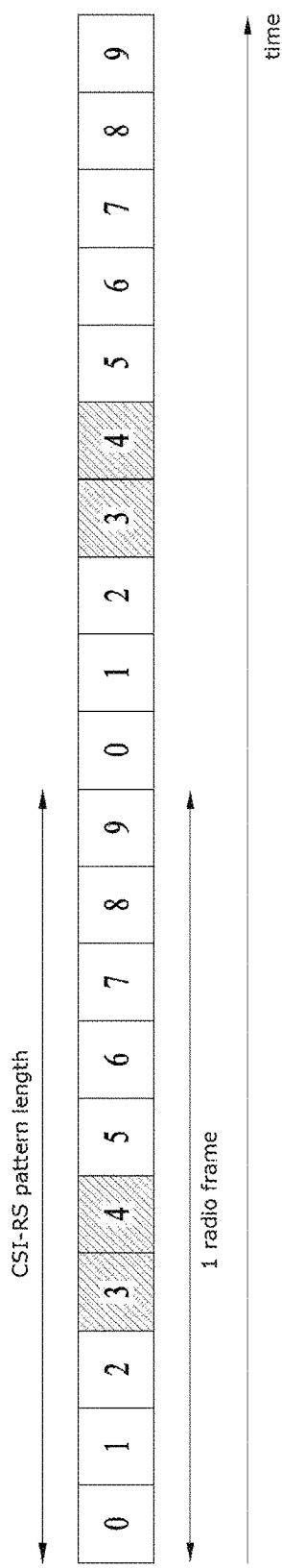
FIG. 14 is a diagram for an example of an aperiodic CSI-RS transmission scheme.

FIG. 14 shows an example of an aperiodic CSI-RS transmission scheme. Referring to FIG. 14, an eNB transmits a CSI-RS at subframe indexes 3 and 4. A transmission pattern includes 10 subframes. In each subframe, whether to transmit a CSI-RS can be designated by a bit indicator.

In general, an eNB is able to inform a UE of CSI-RS configuration by one of two schemes described in the following.

First of all, an eNB can transmit CSI-RS configuration using DBCH (dynamic broadcast channel) signaling that the eNB broadcasts information on CSI-RS configuration to UEs. In LTE system, when contents on system information are informed to UEs, the information is transmitted to the UEs via a BCH (broadcasting channel). Yet, if the contents are too much and the BCH is unable to carry all of the contents, the contents are transmitted using a scheme used for transmitting a general data. And, PDCCH of corresponding data is transmitted in a manner of being CRC-masked using SI-RNTI, i.e., system information RNTI instead of a specific UE ID. And, actual system information is transmitted in a PDSCH region together with a general unicast data. By doing so, all UEs in a cell decode PDCCH using the SI-RNTI, decode PDSCH indicated by the corresponding PDCCH and may be then able to obtain system information. This sort of broadcasting scheme may be called a DBCH (dynamic BCH) to differentiate from a general broadcasting scheme, i.e., PBCH (physical BCH). System information broadcasted in LTE system can be divided into two types. One is a master information block (MIB) transmitted on the PBCH and another one is a system information block (SIB) transmitted on PDSCH and then transmitted in a manner of being multiplexed with a general unicast data. It may be able to transmit VSI-RS configuration using SIB9, SIB10, or the like newly introduced in LTE-A.

An eNB can inform each UE of information on CSI-RS configuration using RRC (radio resource control) signaling. In the course of establishing a connection with the eNB via an initial access or handover of the UE, the eNB informs the UE of the CSI-RS configuration via RRC signaling. Or, an eNB may inform a UE of CSI-RS configuration via an RRC signaling message, which requires feedback based on CSI-RS measurement.

In the following, various embodiments for a UE to perform device to device communication (hereinafter, D2D communication, D2D direct communication, etc.) are explained. In explaining the D2D communication, 3GPP LTE/LTE-A is mainly explained as an example. Yet, the D2D communication can also be applied to a different communication system (e.g., IEEE 802.16, WiMAX, etc.).

D2D Communication Type

D2D communication can be classified into a network coordinated D2D communication type and an autonomous D2D communication type according to whether a D2D communication is performed by a control of a network. The network coordinated D2D communication type can be classified again into a type of transmitting data only by D2D (data only in D2D) and a type of performing an access control only by a network (connection control only in network) according to the extent of involvement of the network. For clarity, the type of transmitting data only by the D2D is called a 'network concentrated D2D communication type' and the type of performing access control only by the network is called a 'distributed D2D communication type' in the following.

According to the network concentrated D2D communication type, data is exchanged between D2D terminals only. An access control (connection control) and radio resource allocation (grant message) between the D2D terminals are performed by a network. The D2D terminals can transmit and receive data or specific control information using a radio resource allocated by the network. For instance, HARQ ACK/NACK feedback for the data reception between the D2D terminals or channel state information (CSI) is not directly exchanged between the D2D terminals. Instead, the feedback or the CSI can be transmitted to a different D2D terminal via the network. Specifically, when the network establishes a D2D link between the D2D terminals and allocates a radio resource to the established D2D link, a transmission D2D terminal and a reception D2D terminal can perform D2D communication using the allocated radio resource. In particular, according to the network concentrated D2D communication type, D2D communication between D2D terminals is controlled by the network and the D2D terminals can perform D2D communication using a radio resource allocated by the network.

A network according to the distributed D2D communication type performs a more limitative role compared to a network according to the network concentrated D2D communication type. Although the network in the distributed D2D communication type performs an access control between D2D terminals, radio resource allocation (grant message) between the D2D terminals can be autonomously occupied by the D2D terminals via contention without a help of the network. For instance, HARQ ACK/NACK feedback for the reception of data between the D2D terminals or channel state information can be directly exchanged between the D2D terminals without passing through the network.

As mentioned earlier in the foregoing example, D2D communication can be classified into the network concentrated D2D communication type and the distributed D2D communication type according to the extent of involvement of a network. In this case, a common characteristic between the network concentrated D2D communication type and the distributed D2D communication type is a D2D access control capable of being performed by the network.

Specifically, a network according to the network coordinated D2D communication type can establish a connection between D2D terminals in a manner of establishing a D2D link between the D2D terminals intending to perform D2D communication. In case of establishing the D2D link between the D2D terminals, the network can assign a physical D2D link identifier (LID) to the established D2D link. The physical D2D link ID can be used as an identifier for identifying each of a plurality of D2D links in case that there are a plurality of the D2D links among a plurality of D2D terminals.

Unlike the network concentrated type and the distributed D2D communication type, according to an autonomous D2D communication type, D2D terminals can freely perform D2D communication without a help of a network. In particular, unlike the network concentrated type and the distributed D2D communication type, an access control, occupation of a radio resource and the like can be autonomously performed by the D2D terminals in the autonomous D2D communication type. If necessary, the network may provide the D2D terminals with D2D channel information capable of being used in a corresponding cell.

Configuration of D2D Communication Link

For clarity, a terminal performing or capable of performing the D2D communication, which is a direct communication between terminals, is called a D2D terminal (D2D terminal). In the following description, a 'UE' may correspond to a D2D terminal. When it is necessary to distinguish a transmitting end from a receiving end, in case of performing the D2D communication, a D2D terminal transmitting or intending to transmit data to a different D2D terminal using a radio resource given to a D2D link is called a transmission D2D terminal. On the contrary, a terminal receiving or intending to receive data from the transmission D2D terminal is called a reception D2D terminal. If there exist a plurality of reception D2D terminals, which receive or intend to receive data from the transmission D2D terminal, a plurality of the reception D2D terminals can be distinguished from each other using a prefix such as 'first to N'. Moreover, for clarity, such a random node of a network as a base station configured to perform access control between D2D terminals or allocate a radio resource to a D2D link, a D2D server, an access/session management server and the like are commonly called a 'network' in the following description.

In order for a D2D terminal performing D2D communication to transmit data to a different D2D terminal via the D2D communication, it is necessary for the D2D to check whether or not D2D terminals capable of transmitting and receiving data are located near the D2D terminal. To this end, the D2D terminal performs D2D peer discovery. The D2D terminal performs D2D discovery within a discovery interval and all D2D terminals may share the discovery interval. The D2D terminal monitors logical channels of a discovery region within the discovery interval to receive D2D discovery signals transmitted by different D2D terminals. Having received the signals of the different D2D terminals, the D2D terminal makes a list of adjacent D2D terminals using the received signal. And, the D2D terminal broadcasts information (i.e., an identifier) of the D2D terminal within the discovery interval and the different D2D terminals receive the broadcasted D2D discovery signal. By doing so, the different D2D terminals are able to know that the D2D terminal exists within a range capable of performing D2D communication.

Information broadcasting for D2D discovery can be periodically performed. And, broadcasting timing can be determined in advance by a protocol and can be notified to D2D terminals. The D2D terminal can transmit/broadcast a signal during a part of the discovery interval. Each of the D2D terminals may monitor signals potentially transmitted by different D2D terminals during the rest of the D2D discovery interval.

For example, a D2D discovery signal may correspond to a beacon signal. And, D2D discovery intervals may include a plurality of symbols (e.g., OFDM symbols). A D2D terminal selects at least one symbol belonging to a D2D discovery interval to transmit/broadcast a D2D discovery signal. And, the D2D terminal may transmit a signal corresponding to a tone of the symbol selected by the D2D terminal.

After D2D UEs discovers each other through a D2D discovery process, the D2D UEs perform a connection establishment process. By doing so, one D2D UE can transmit traffic to the other D2D UE.

Figure 15:
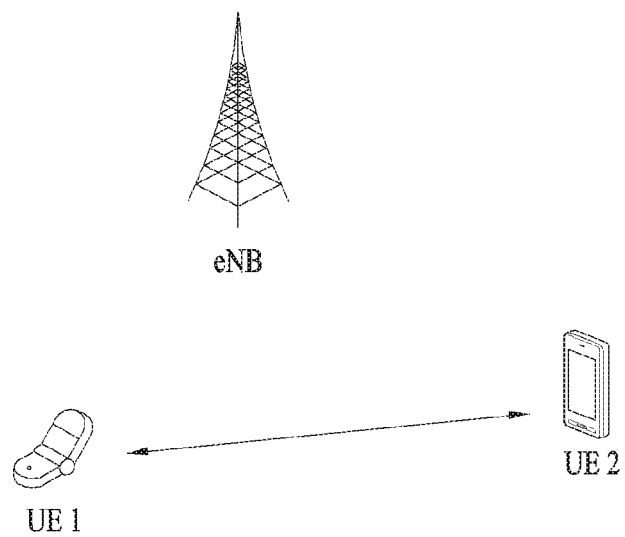
FIG. 15 is a diagram for a simplified D2D communication network.

FIG. 15 is a diagram for a simplified D2D communication network.

Referring to FIG. 15, D2D communication is performed between UEs (UE1 and UE2) supporting D2D communication. In general, a user equipment (UE) corresponds to a terminal of a user. If such a network device as an eNB (evolved Node B) transmits and receives a signal according to a communication scheme between the UEs UE1 and UE2), the eNB can be considered as a UE as well.

A UE1 selects a resource unit corresponding to a specific resource from a resource pool corresponding to a set of resources and the UE1 transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission.

Figure 16:
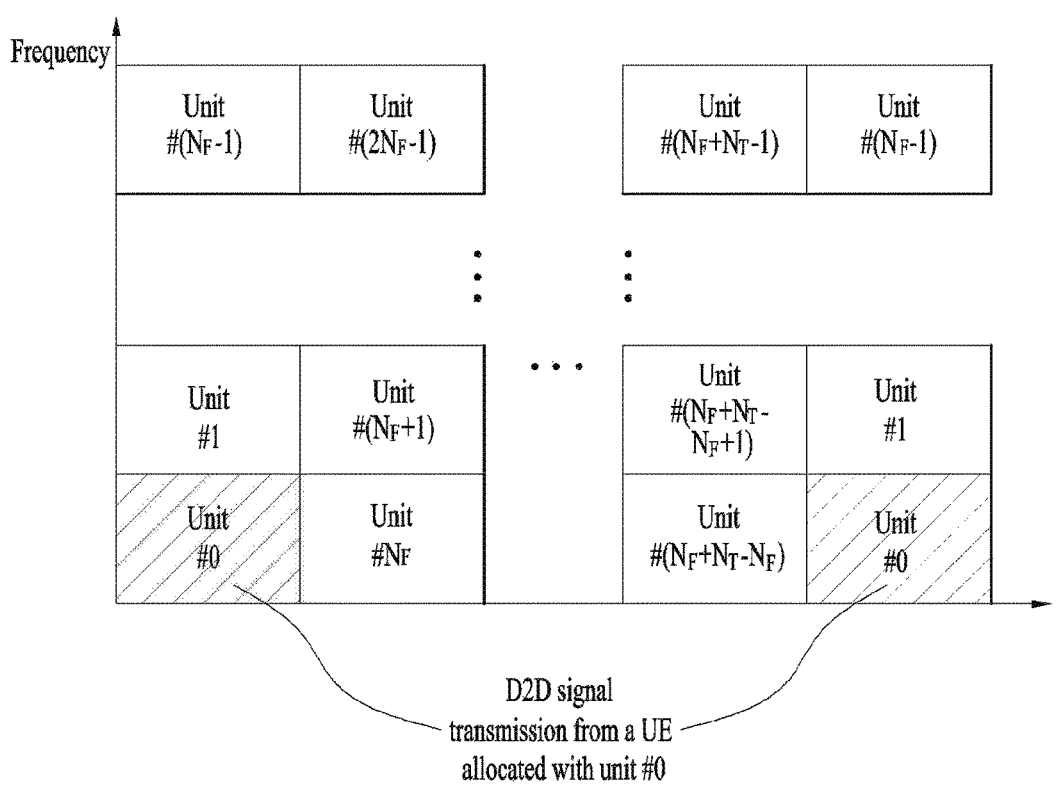
FIG. 16 is a diagram for a configuration of a resource unit according to an example.

FIG. 16 is a diagram for a configuration of a resource unit according to an example.

In FIG. 16, a vertical axis corresponds to a frequency resource and a horizontal axis corresponds to a time resource. A radio resource is divided into the $N_T$ number of resource units in a time axis to configure the $N_T$ number of subframes. And, a frequency resource is divided into the $N_F$ number of resource units in a subframe. In particular, one subframe can include the $N_T$ number of symbols. In particular, it is able to define $N_F*N_T$ number of resource units in total.

A D2D transmission resource (unit #0) allocated to a unit number 0 is repeated in every $N_T$ number of subframes. In embodiment of FIG. 16, a resource pool can be repeated with a period of the $N_T$ number of subframes. As shown in FIG. 16, a specific resource unit may periodically and repeatedly appear. Or, an index of a physical resource unit to which a logical resource unit is mapped may change according to a predetermined pattern to obtain a diversity gain in time domain and/or frequency domain. For example, the logical resource unit can hop on time and/or frequency axis according to a predetermined pattern set to an actual physical resource unit. In FIG. 16, a resource pool may correspond to a set of resource units capable of being used by a UE intending to transmit a D2D signal.

The resource pool can be classified into various types. First of all, the resource pool can be classified according to contents of a D2D signal transmitted via each resource pool. For example, the contents of the D2D signal can be classified into various signals and a separate resource pool can be configured according to each of the contents.

Scheduling assignment (SA): The SA may correspond to a signal including information on a resource position of a D2D data channel, information on MCS (modulation and coding scheme) necessary for modulating and demodulating a data channel, information on a MIMO transmission scheme, and the like. SA information may include an identifier of a target UE to which data of each transmission UE is to be transmitted. A signal including the SA information can be transmitted on an identical resource unit in a manner of being multiplexed with D2D data. In this case, an SA resource pool may correspond to a pool of resources that SA and D2D data are transmitted in a manner of being multiplexed.

D2D data channel: The D2D data channel corresponds to a resource pool used by a transmission UE to transmit user data using a resource designated by the SA. If an SA signal and a D2D data channel are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool.

Discovery message: A discovery message resource pool corresponds to a resource pool for transmitting a discovery message that enables neighboring UEs to discover a transmission UE transmitting information such as ID of the UE, and the like.

As mentioned in the foregoing description, a D2D resource pool can also be classified according to content of a D2D signal. Yet, although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), and the like.

According to the aforementioned contents, a UE intending to transmit data via D2D selects an appropriate resource from an SA pool and transmits SA of the transmission UE. In this case, as a reference for selecting an SA resource pool, it may be able to preferentially select an SA resource interlocked with a resource that satisfies at least one of a resource not transmitting SA of a different UE and a resource which is expected not to transmit data in a following subframe according to SA of a different UE. In addition, the transmission UE may select an SA resource interlocked with a data transmission resource of which an interference level is expected to be low. And, the SA information can be broadcasted. In doing so, UEs belonging to a D2D communication system may receive the broadcasted SA information. In the following, 'transmitting' or 'sending' can be replaced with 'broadcasting'.

In the aforementioned D2D communication, the term 'D2D' can be replaced by 'sidelink'.

Figure 17:
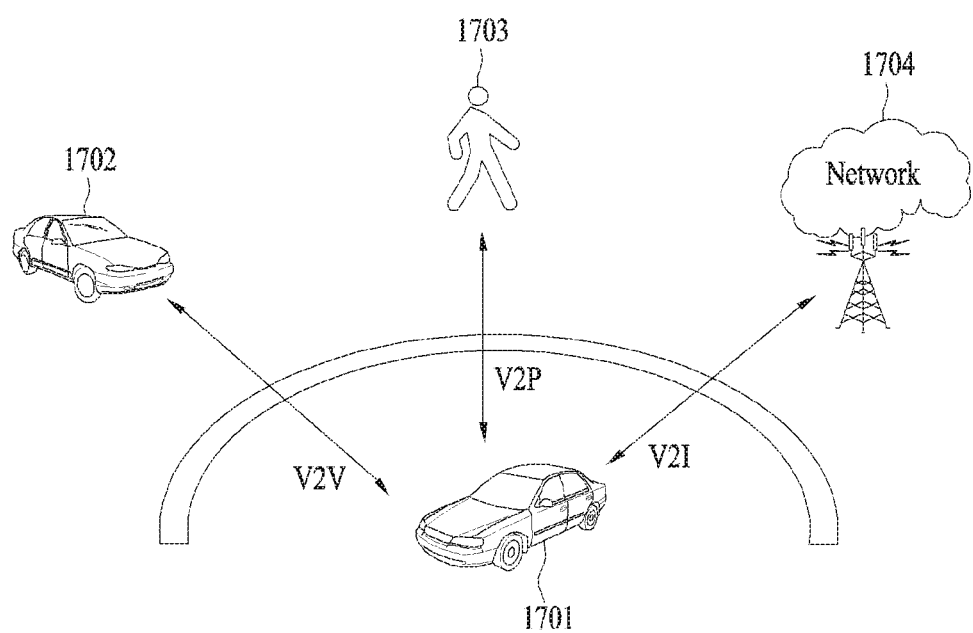
FIG. 17 is a schematic diagram showing a V2X communication network.

FIG. 17 is a schematic diagram showing a V2X communication network.

V2X communication may be categorized into V2V (vehicle-to-vehicle) communication, V2P (vehicle-to-pedestrian) communication, and V2I (vehicle-to-infrastructure entity) communication. V2V communication may refer to communication between vehicles 1001 and 1002. Traffic information and the like may be shared between the vehicles 1001 and 1002 through V2V communication. V2P communication may refer to communication between the vehicle 1001 and a device (e.g., a handheld terminal of a pedestrian or a bicycle rider) carried by a pedestrian 1003. Since the pedestrian 1003 can move along a sidewalk adjacent to a road as well, information on a danger on the road and the like may be shared through V2P communication. And, V2I communication may refer to communication between the vehicle and a roadside unit (RSU) 1004. The RSU 1004 may refer to a traffic infrastructure entity. For example, the RSU 1004 may include an entity that transmits a speed notification. For V2X communication, the vehicles 1001 and 1002, the RSU 1004 and the handheld device of the pedestrian 1003 may be equipped with transceivers. V2X communication may be implemented using a technology similar to D2D (device-to-device) communication of the communication standard of the 3GPP (3$^{rd}$ generation partnership project). And, V2X communication may be implemented using DSRC (dedicated short-range communication) technology of IEEE (institute of electrical and electronics engineers).

In the following, a method of sending an alarm message through V2X communication according to an embodiment of the present invention is described. Although the following description is made centering on V2V communication, the following embodiments are applicable to V2I communication and/or V2P communication. Although the following embodiments are described centering on the communication standards of 3GPP, they may be applied by the technologies corresponding to the communication standards of IEEE. In the following description, the term 'sending (or transmission)' and the term 'broadcasting' are exchangeable with each other. In the following description, a vehicle or pedestrian may mean a vehicle or pedestrian carrying a user equipment. In the following description, a vehicle or pedestrian may be used as a term that means a terminal itself.

Although the following description is made based on vehicle-to-something (V2X) communication, for example, V2V communication, the invention can be applied to other types of communication including D2D communication. As described above, a frequency offset error may occur in a certain scenario where a UE moves (e.g., V2X scenario). For example, if a frequency offset of a received signal is higher than a predetermined level due to the Doppler effect, a receiving UE may fail to decode the received signal.

Figure 18A:
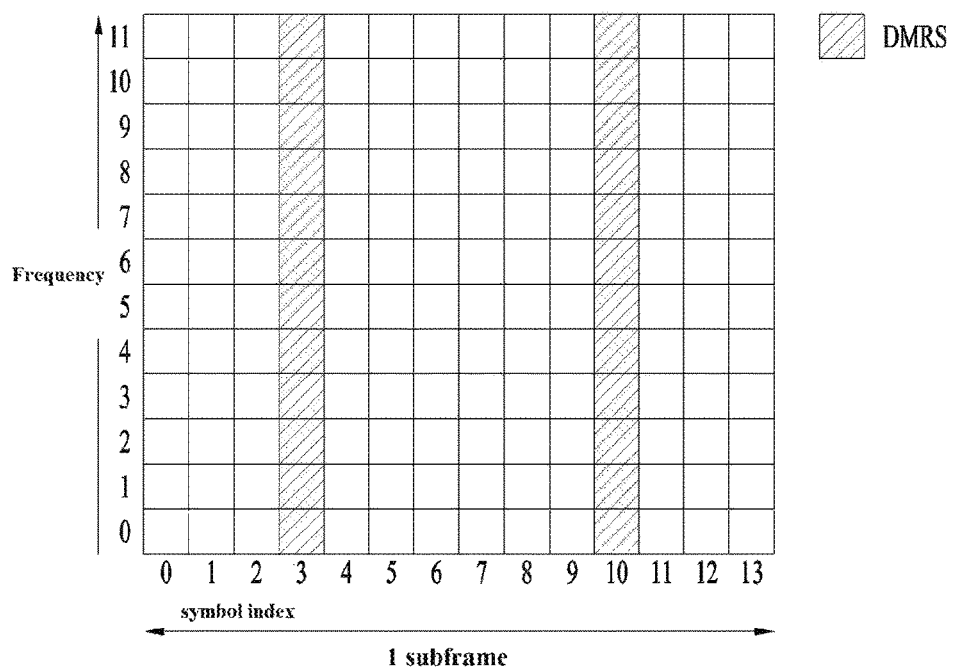
FIG. 18a illustrates DMRS mapping in the case of a normal cyclic prefix (CP).
Figure 18B:
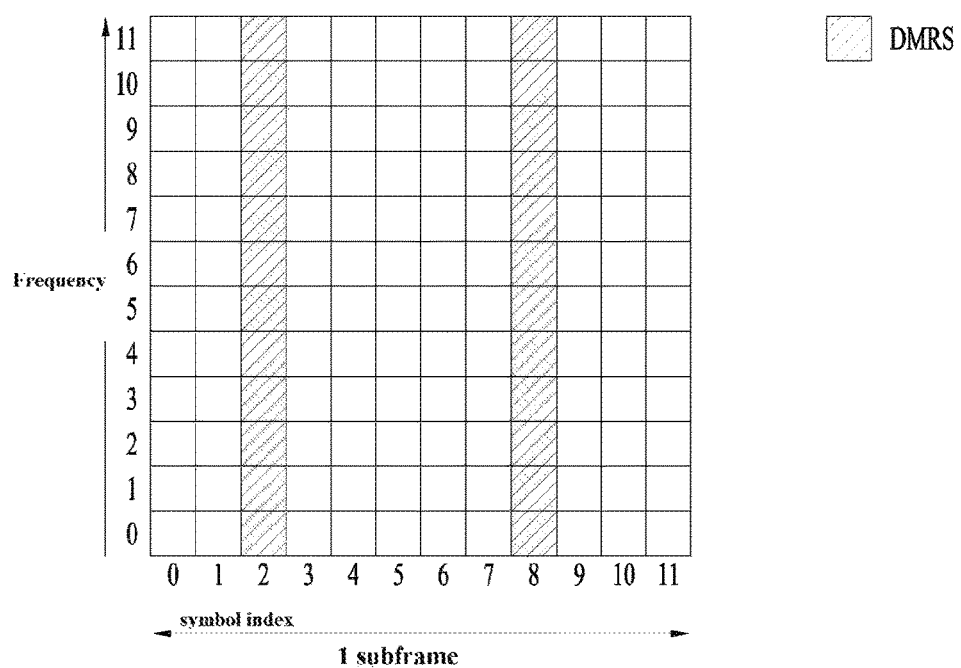
FIG. 18b illustrates DMRS mapping in the case of an extended cyclic prefix (CP).

FIG. 18*a* illustrates DMRS mapping in the case of a normal cyclic prefix (CP), and FIG. 18*b* illustrates DMRS mapping in the case of an extended cyclic prefix (CP).

In V2X communication, the subframe structure designed for the conventional LTE physical uplink shared channel (PUSCH) can be used. In the current LTE system, a DMRS may be mapped in a subframe with the normal CP as shown in FIG. 18*a*. For example, referring to FIG. 18*a*, a DMRS may be mapped to orthogonal frequency division multiplexing (OFDM) symbols 3 and 10. In addition, in the current LTE system, in a subframe with the extended CP, a DMRS may be mapped as shown in FIG. 18*b*. For example, referring to FIG. 18*b*, a DMRS may be mapped to OFDM symbols 2 and 8.

Meanwhile, in the V2X scenario including the V2V scenario, 5.9 GHz of frequency, which is used for dedicated short range communication (DSRC), has been researched as the center frequency. In addition, for example, an initial frequency offset requirement for V2V communication can be defined as 10 ppm (parts per million). Moreover, a residual frequency offset request may be defined as +/−0.1 ppm. For instance, two vehicles may be synchronized with each other based on a signal provided by a shared eNB, vehicle, or other sources. In this case, a frequency offset difference between the two vehicles may be +/−0.2 ppm. For example, a first vehicle may be synchronized based on a signal from a second vehicle. In this case, a third vehicle may be synchronized with the first vehicle. That is, since the third vehicle is synchronized across the two vehicles, the synchronization of the third vehicle may be referred to as two-hop synchronization (hop-sync). Moreover, a fourth vehicle may be synchronized with the first vehicle. Thus, the fourth vehicle may have two-hop synchronization. In this case, a frequency offset difference between the third and fourth vehicles, which is based on the same first vehicle, may be +/−0.4 ppm. For example, a frequency offset difference between two vehicles with three-hop synchronization with respect to the same vehicle may be +/−0.6 ppm.

When a DMRS is mapped to two OFDM symbols in a subframe as shown in FIG. 18*a*, a receiving UE (e.g., vehicle) may perform frequency offset adjustment using the DMRS configured with two columns. In FIG. 18*a*, there are 5 OFDM symbols between first and second DMRSs. In this case, a time interval of 0.5 ms may exist between the two DMRSs. In addition, the UE may estimate a change in a frequency offset based on a change in a phase offset. Thus, the UE should be able to estimate the change in the phase offset due to increase in the frequency offset during 0.5 ms.

Table 3 below shows increase in the phase offset during 0.5 ms according to the center frequency and hop synchronization.

TABLE 3

| Center frequency | One-hop sync (0.1 ppm) | Two-hop sync (0.4 ppm) | Three-hop sync (0.6 ppm) |
|---|---|---|---|
| 700 MHz | 70 Hz (0.22 rad) | 280 Hz (0.88 rad) | 420 Hz (1.32 rad) |
| 2 GHz | 200 Hz (0.63 rad) | 800 Hz (2.51 rad) | 1200 Hz (3.77 rad) |
| 5.9 GHz | 590 Hz (1.85 rad) | | |

As shown in Table 3, even though the frequency offset at the center frequency of 700 MHz is +/−0.6 ppm, the increase in the phase offset does not exceed the value of pi. Thus, at the center frequency of 700 MHz, the current DMRS structure can be used for the frequency offset adjustment. However, when the frequency offset at the center frequency of 2 GHz is +/−0.6 ppm, the phase offset value exceeds the value of pi. In this case, the UE may fail to adjust the frequency offset.

Actually, the minimum frequency offset of V2V communication can be defined as +/−0.2 ppm. As described above, when two vehicles are synchronized through the same vehicle or eNB, the frequency offset can be assumed to be +/−0.2 ppm. In this case, as shown in Table 1, a UE operating at the center frequency of 5.9 GHz may not adjust the frequency offset using the current DMRS structure (e.g., the structure of FIG. 18a or 18b).

Table 4 shows a phase offset (in the unit of radian) depending on an interval between the frequency offset and each DMRS (OFDM symbol unit).

TABLE 4

| | 0.1 ppm | 0.2 ppm | 0.3 ppm | 0.4 ppm | 0.5 ppm | 0.6 ppm | 0.7 ppm | 0.8 ppm | 0.9 ppm | 1.0 ppm |
|---|---|---|---|---|---|---|---|---|---|---|
| 1 symbol | 0.264791 | 0.529583 | 0.794374 | 1.059165 | 1.323957 | 1.588748 | 1.853539 | 2.118331 | 2.383122 | 2.647913 |
| 2 symbols | 0.529583 | 1.059165 | 1.588748 | 2.118331 | 2.647913 | 3.1775 | 3.70708 | 4.23666 | 4.76624 | 5.29583 |
| 3 symbols | 0.794374 | 1.588748 | 2.383122 | 3.1775 | 3.97187 | 4.76624 | 5.56062 | 6.35499 | 7.14937 | 7.94374 |
| 4 symbols | 1.059165 | 2.118331 | 3.1775 | 4.23666 | 5.29583 | 6.35499 | 7.41416 | 8.47332 | 9.53249 | 10.5917 |
| 5 symbols | 1.323957 | 2.647913 | 3.97187 | 5.29583 | 6.61978 | 7.94374 | 9.2677 | 10.5917 | 11.9156 | 13.2396 |
| 6 symbols | 1.588748 | 3.1775 | 4.76624 | 6.35499 | 7.94374 | 9.53249 | 11.1212 | 12.71 | 14.2987 | 15.8875 |
| 7 symbols | 1.853539 | 3.70708 | 5.56062 | 7.41416 | 9.2677 | 11.1212 | 12.9748 | 14.8283 | 16.6819 | 18.5354 |
| 8 symbols | 2.118331 | 4.23666 | 6.35499 | 8.47332 | 10.5917 | 12.71 | 14.8283 | 16.9466 | 19.065 | 21.1833 |
| 9 symbols | 2.383122 | 4.76624 | 7.14937 | 9.53249 | 11.9156 | 14.2987 | 16.6819 | 19.065 | 21.4481 | 23.8312 |
| 10 symbols | 2.647913 | 5.29583 | 7.94374 | 10.5917 | 13.2396 | 15.8875 | 18.5354 | 21.1833 | 23.8312 | 26.4791 |
| 11 symbols | 2.912705 | 5.82541 | 8.73811 | 11.6508 | 14.5635 | 17.4762 | 20.3889 | 23.3016 | 26.2143 | 29.127 |
| 12 symbols | 3.1775 | 6.35499 | 9.53249 | 12.71 | 15.8875 | 19.065 | 22.2425 | 25.42 | 28.5975 | 31.775 |
| 13 symbols | 3.44229 | 6.88457 | 10.3269 | 13.7691 | 17.2114 | 20.6537 | 24.096 | 27.5383 | 30.9806 | 34.4229 |
| 14 symbols | 3.70708 | 7.41416 | 11.1212 | 14.8283 | 18.5354 | 22.2425 | 25.9495 | 29.6566 | 33.3637 | 37.0708 |

As shown in Table 4, when the frequency offset is +/−0.2 ppm, a DMRS needs to be mapped at an interval consisting of at least five symbols for the frequency offset adjustment. In addition, when the frequency offset is +/−0.4 ppm, a DMRS needs to be mapped at an interval consisting of at least two symbols. When the frequency offset is +/−0.6 ppm, a DMRS needs to be mapped at an interval consisting of at least one symbol.

That is, the DMRS design with an interval of seven OFDM symbols, which is used for UL transmission in the current LTE system, is not suitable for an environment with a large frequency offset.

Hereinafter, a description will be given of DMRS design for V2X or D2D communication. In the following description, it is assumed that a DMRS can be mapped to three symbols or more in one subframe.

Figure 19A:
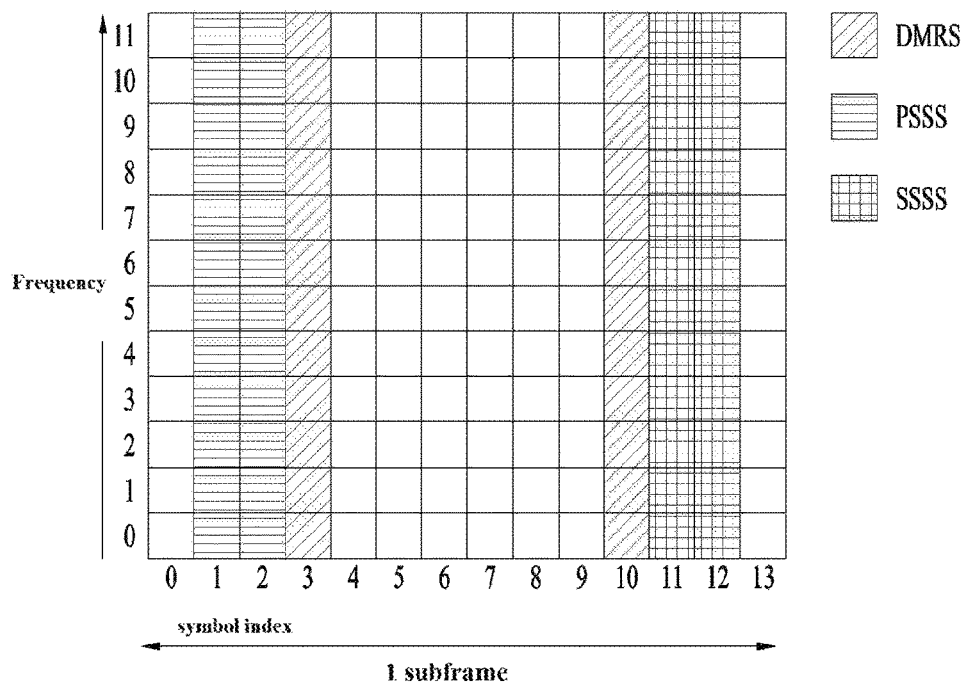
FIGS. 19a and 19b illustrate synchronization signal mapping according to an embodiment of the present invention.
Figure 19B:
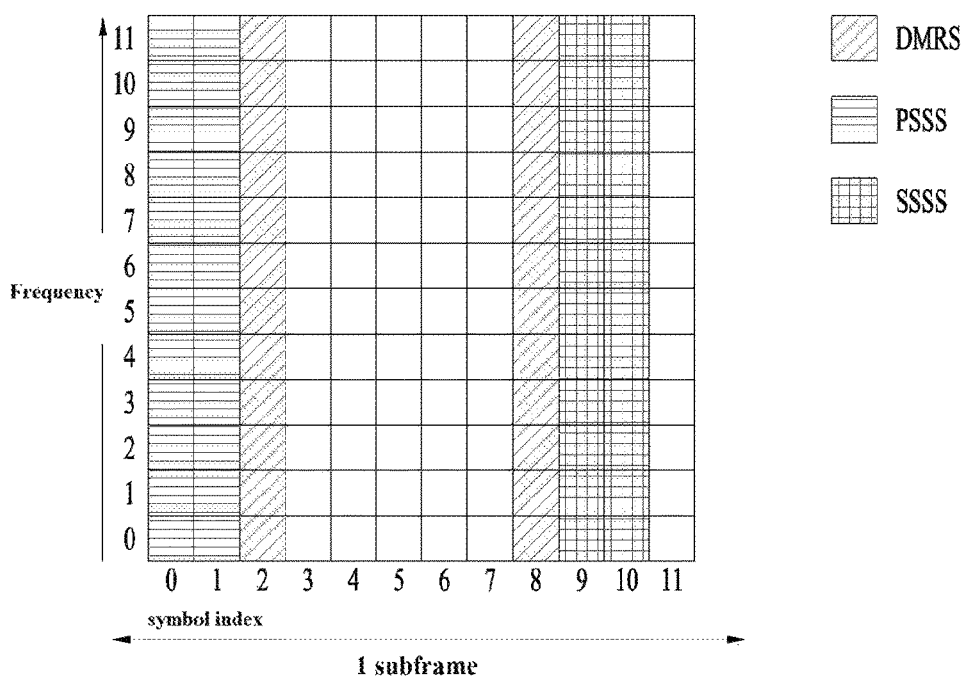

FIGS. 19a and 19b illustrate synchronization signal mapping according to an embodiment of the present invention.

First, reference signal mapping in a physical sidelink broadcast channel (PSBCH) in the current D2D communication will be explained with reference to FIGS. 19a and 19b. In the case of the normal CP, a DMRS is mapped as shown in FIG. 19a. In the case of the normal CP, a DMRS is mapped as shown in FIG. 19b.

Referring to FIGS. 19a and 19b, it can be seen that transmission is performed in a state that the last OFDM symbol (OFDM symbol 13 of FIG. 19a and OFDM symbol 11 of FIG. 19b) is unoccupied. This is because the last OFDM symbol is used as a D2D guard period for performing Rx/Tx switching.

For example, as shown in FIGS. 19a and 19b, synchronization signals (e.g., a physical sidelink synchronization signal (PSSS) and a secondary sidelink synchronization signal (SSSS)) can be mapped to a PSBCH for V2X communication. For example, the SSSS may be mapped to two consecutive symbols of the PSBCH. Currently, transmit power of the SSSS is reduced for a PAPR. Thus, when OFDM symbols reserved for other uses are located between the OFDM symbols for the SSSS, power adjustment for the SSSS may be performed several times. For example, in this case, a UE may be required to adjust power for SSSS transmission, adjust power for the OFDM symbols reserved for other uses, and adjust power for SSSS transmission again. Such a power adjustment process may cause a power transient interval, and the power transient interval may cause distortion in a transmitted signal. In other words, by mapping an SSSS to consecutive OFDM symbols, it is possible to reduce a power transient interval.

Figure 20:
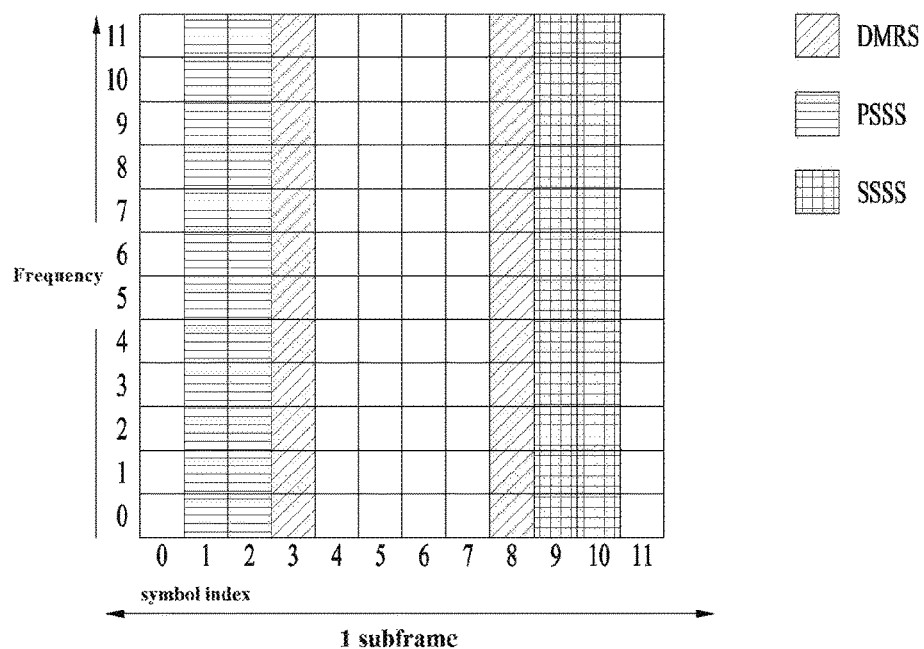
FIG. 20 illustrates mapping of reference and synchronization signals in the case of an extended CP according to an embodiment of the present invention.

FIG. 20 illustrates mapping of reference and synchronization signals in the case of an extended CP according to an embodiment of the present invention.

For example, in the case of the normal CP, OFDM symbol 0 and OFDM symbol 13 may be used for automatic gain control (AGC) and/or Rx/Tx switching. In the case of the extended CP, OFDM symbol 0 and OFDM symbol 11 may be used for the AGC and/or Rx/Tx switching. In this case, when a DMRS and a PSSS are mapped as shown in FIG. 19b, OFDM symbol 0 is used for the PSSS. Thus, in the case of the extended CP, a DMRS and a PSSS may be mapped as shown in FIG. 20. In FIG. 20, the PSSS are mapped to OFDM symbols 1 and 2, and the DMRS is mapped to OFDM symbol 3.

Figure 21:
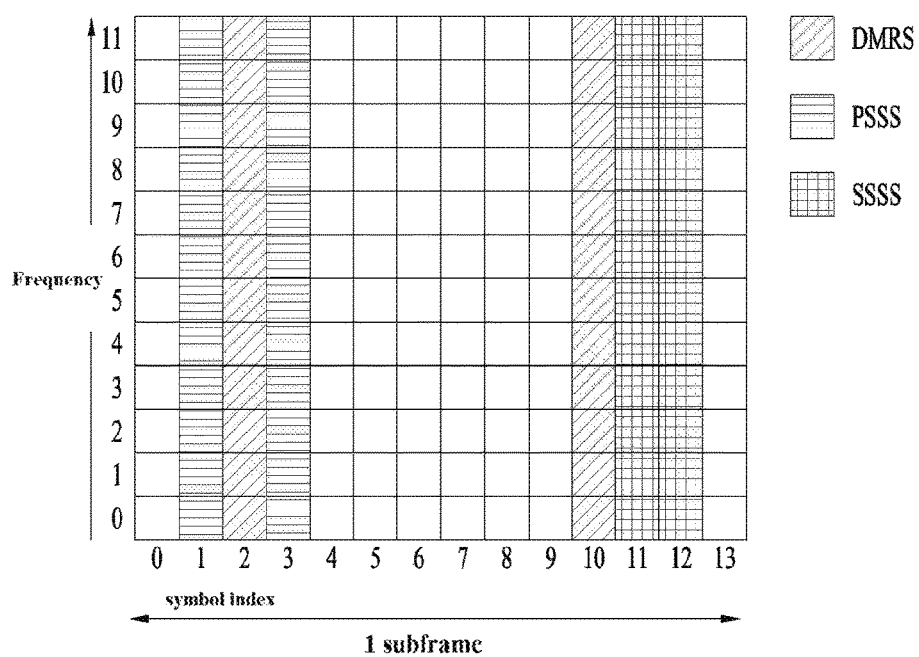
FIG. 21 illustrates mapping of reference and synchronization signals in the case of a normal CP according to an embodiment of the present invention.

FIG. 21 illustrates mapping of reference and synchronization signals in the case of a normal CP according to an embodiment of the present invention.

In the case of the normal CP, symbol 0 may not be used for the AGC and/or Rx/Tx switching. In this case, as shown in FIG. 19a, a UE that receives the PSBCH should estimate a channel of OFDM symbol 0 using the DMRS of OFDM symbol 3. However, as described above, the UE may have difficulties in estimating the channel of OFDM symbol 0 using OFDM symbol 3 due to a frequency offset. Thus, a DMRS may be mapped between symbols to which a PSSS is mapped. For example, as shown in FIG. 21, a PSSS may be mapped to OFDM symbols 1 and 3, and a DMRS may be mapped to OFDM symbol 2. When the DMRS is mapped to OFDM symbol 2, an interval between it and OFDM symbol 0 may be reduced. Therefore, it is possible to improve channel estimation performance of OFDM symbol 0 using the DMRS mapped to OFDM symbol 2.

Figure 22A:
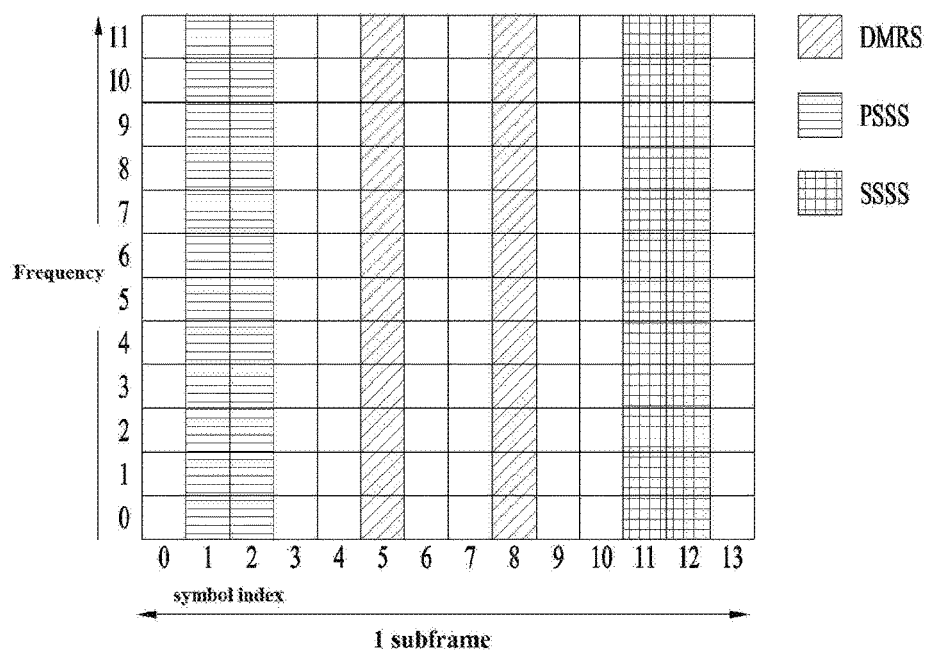
FIGS. 22a and 22b illustrate reference signal mapping according to an embodiment of the present invention.
Figure 22B:
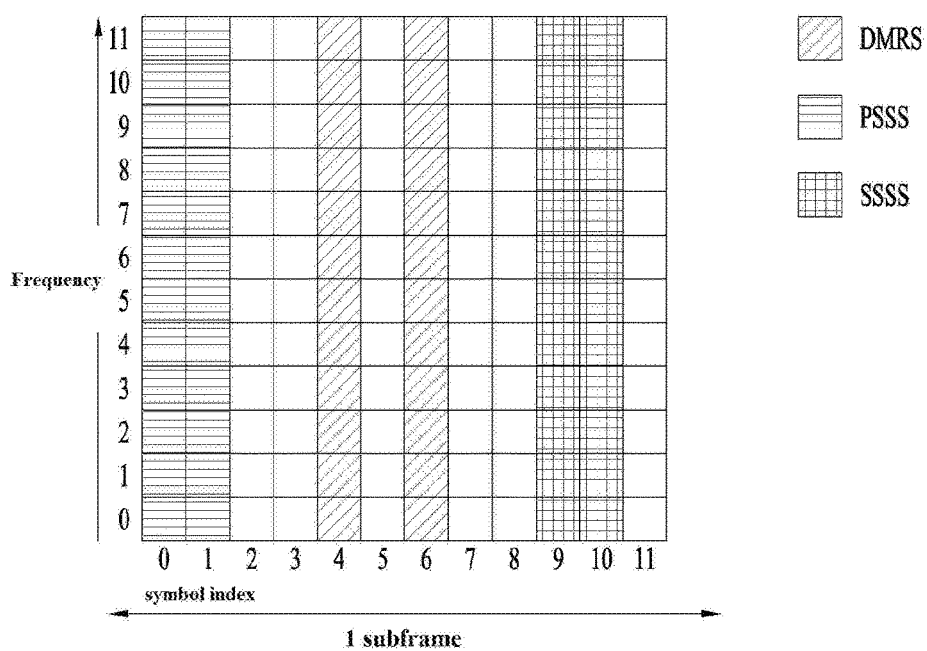

FIGS. 22a and 22b illustrate reference signal mapping according to an embodiment of the present invention.

For example, a DMRS mapping location may be changed for the frequency offset adjustment. In addition, for example, a PSSS and an SSSS may be used for the frequency offset adjustment. For example, in the case of the normal CP, a DMRS may be mapped to OFDM symbols 5 and 8 as shown in FIG. 22a. That is, a reference signal and a synchronization signal may be mapped at the same interval. In addition, in FIG. 22a, based on each of OFDM symbols 5 and 8, outer-polation may be performed on two symbols. To improve performance of the outer-polation, a DMRS may be mapped to OFDM symbols 4 and 8 or OFDM symbols 5 and 9.

For example, in the case of the extended CP, a DMRS may be mapped to OFDM symbols 4 and 6. In addition, for example, to reduce an interval between a synchronization signal and a DMRS, the DMRS may be mapped to OFDM symbols 4 and 7 or OFDM symbols 3 and 6. In addition, when the DMRS is mapped to OFDM symbols 4 and 7, the DMRS can be located in each slot. In addition, when the DMRS is mapped to OFDM symbols 4 and 7, slot hopping can be supported.

In addition to the existing DMRS consisting of two symbols (two-symbol DMRS), a one-symbol DMRS may be added for the purpose of the frequency offset adjustment. It can be interpreted to mean that a three-symbol DMRS is mapped to one subframe. Referring to FIG. 19a, in the case of the normal CP, the DMRS may be added to OFDM symbols 6 and 7. In addition, referring to FIG. 21, the DMRS may be added to OFDM symbol 6. Moreover, for example, referring to FIG. 19b, in the case of the extended CP, the DMRS may be added to OFDM symbol 5. Referring to FIG. 20, the DMRS may be added to OFDM symbol 5 or 6.

Moreover, in addition to the existing two-symbol DMRS, another two-symbol DMRS may be added for the purpose of the frequency offset adjustment. For example, referring to FIG. 19a, the DMRS may be added to OFDM symbols 5 and 8, OFDM symbols 5 and 7, or OFDM symbols 6 and 8. Moreover, referring to FIG. 21, the DMRS may be added to OFDM symbols 4 and 7, OFDM symbols 5 and 7, or OFDM symbols 5 and 8. For example, referring to FIG. 19b, in the case of the extended CP, the DMRS may be added to OFDM symbols 4 and 6. Referring to FIG. 20, the DMRS may be added to OFDM symbols 5 and 6.

Furthermore, a three-symbol DMRS may be newly designed for the frequency offset adjustment. For example, a location of the existing two-symbol DMRS may be changed. Referring to FIG. 19a, in the case of the normal CP, a DMRS is mapped to OFDM symbol 3 and OFDM symbol 10. In this case, a one-symbol DMRS may be added to OFDM symbol 6 or OFDM symbol 7 to maintain an interval between DMRSs. By doing so, the added DMRS has an interval consisting of three symbols from a part of the existing DMRS (which is mapped to OFDM symbol 3 or OFDM symbol 10). The interval consisting of three symbols may be inappropriate for the frequency offset adjustment as mentioned in the foregoing description.

For example, OFDM symbol 0 and OFDM symbol 13 may be used for the AGC and/or Rx/Tx switching. In this case, OFDM symbol 0 and OFDM symbol 13 may not be used for the frequency offset adjustment. In addition, a reference signal or synchronization signal may not be mapped to OFDM symbol 0 and OFDM symbol 13. Hereinafter, DMRS mapping will be described with reference to FIGS. 23a to 23d.

Figure 23A:
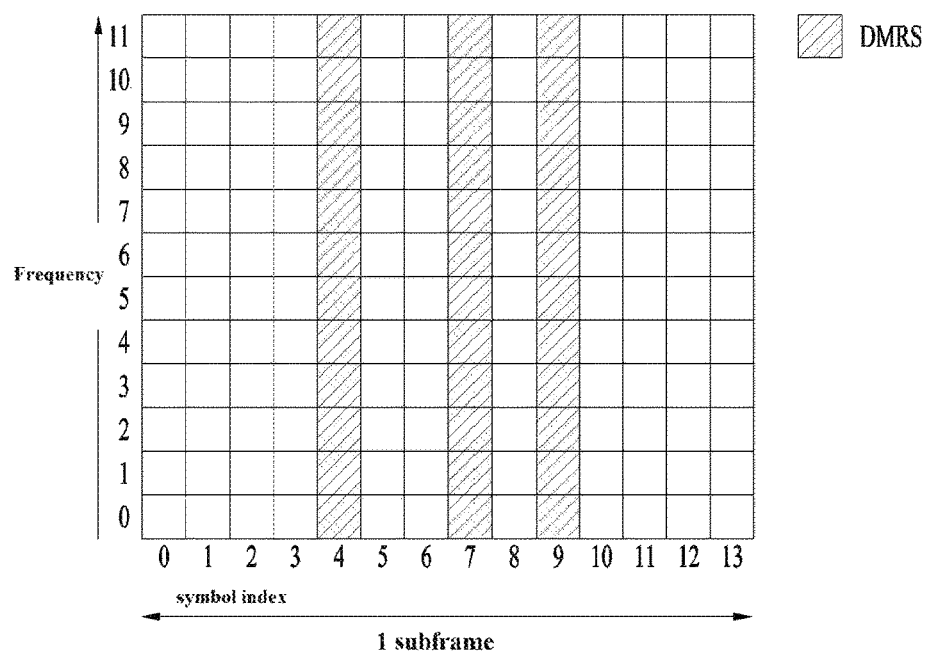
FIGS. 23a to 23e illustrate embodiments of three-symbol DMRS mapping.

FIG. 23a shows three-symbol DMRS mapping according to an embodiment. As shown in FIG. 23a, a DMRS may be mapped to OFDM symbols 4, 7, and 9. In this case, a DMRS interval does not exceed two OFDM symbols. In addition, in the case of OFDM symbols 3 and 10, channel estimation may be performed based on the DMRS. For example, DMRS-based outer-polation can be performed.

Figure 23B:
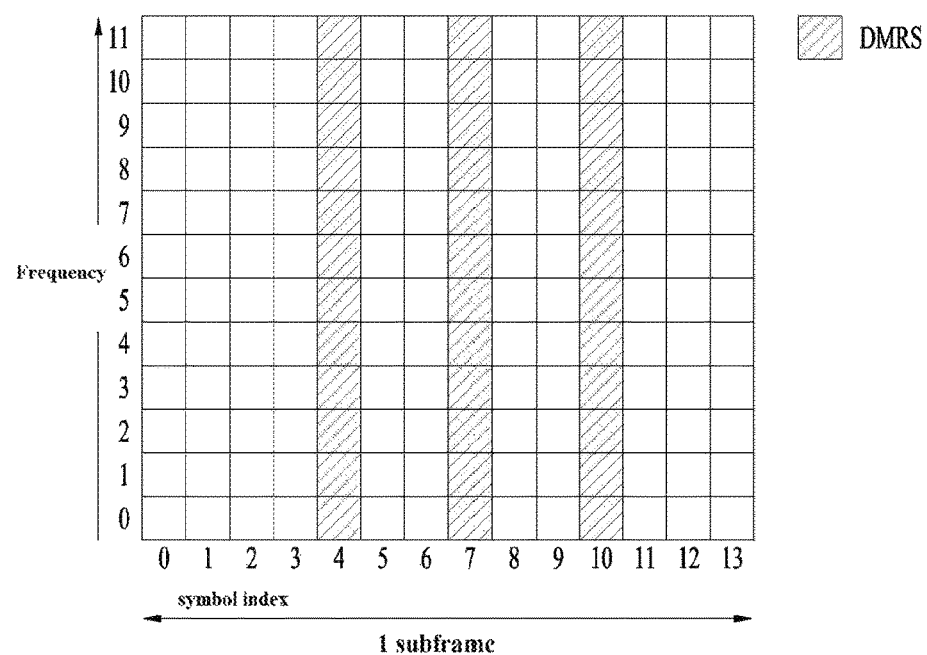

FIG. 23b shows three-symbol DMRS mapping according to another embodiment. As shown in FIG. 23b, a DMRS may be mapped to OFDM symbols 4, 7, and 10. In general, the outer-polation has lower performance than that of the interpolation. Thus, when the DMRS is mapped as shown in FIG. 23b, the outer-polation may decrease, whereas the interpolation may increase.

Figure 23C:
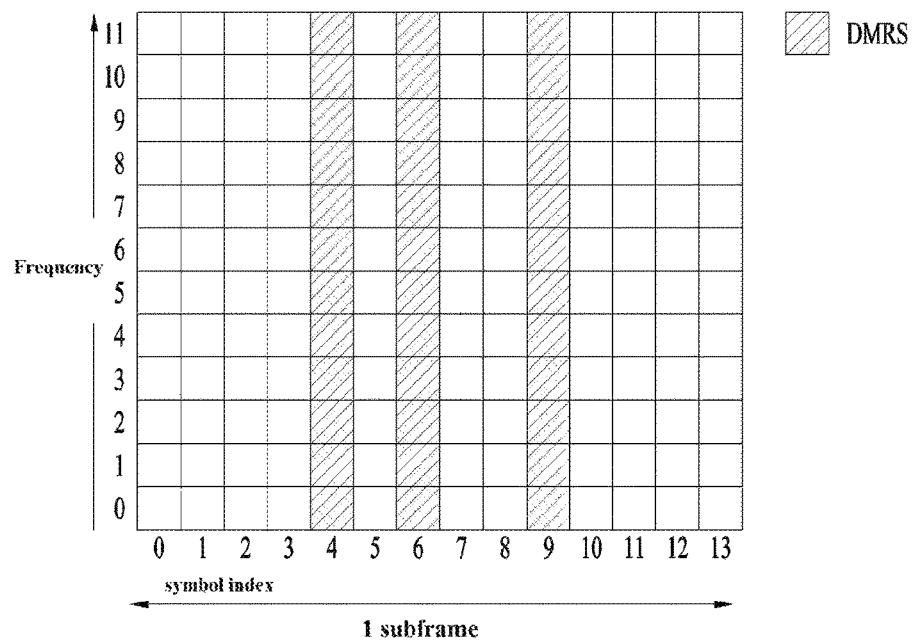

FIG. 23c shows three-symbol DMRS mapping according to a further embodiment. As shown in FIG. 23c, a DMRS may be mapped to OFDM symbols 4, 6, and 9. In this case, the DMRS is mapped at an interval of up to two symbols in the time domain. In the case of OFDM symbols where the DMRS is not mapped, channel estimation may be performed based on the DMRS. For example, in the case of OFDM symbols 5, 7, and 8, channels may be estimated through DMRS interpolation. In addition, for example, channels with respect to OFDM symbols 3 and 10 may be estimated based on the DMRS-based outer-polation.

Figure 23D:
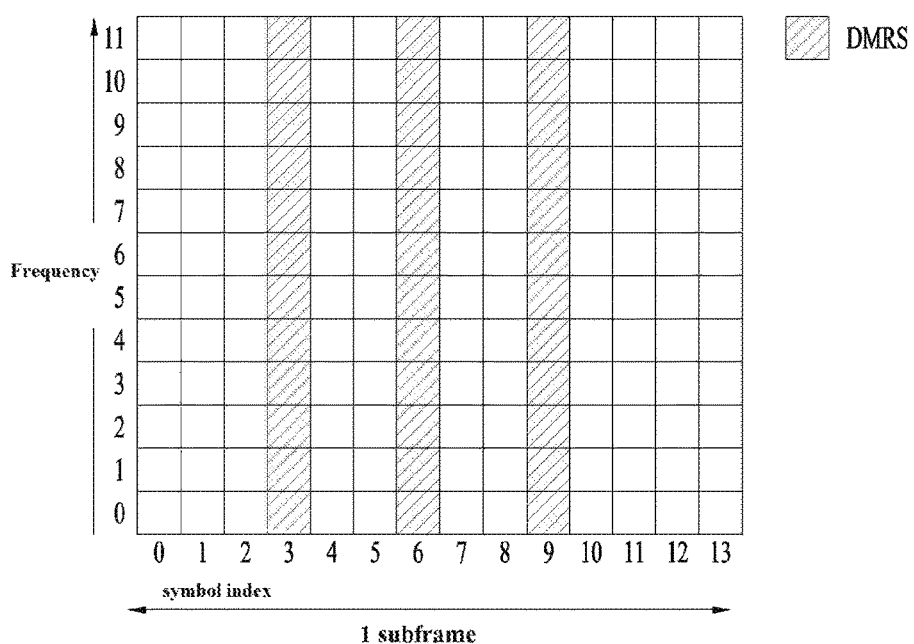

FIG. 23d shows three-symbol DMRS mapping according to still another embodiment. As shown in FIG. 23d, a DMRS may be mapped to OFDM symbols 3, 6, and 9. In this case, a DMRS interval does not exceed two OFDM symbols. In addition, the outer-polation may decrease, whereas the interpolation may increase.

Figure 23E:
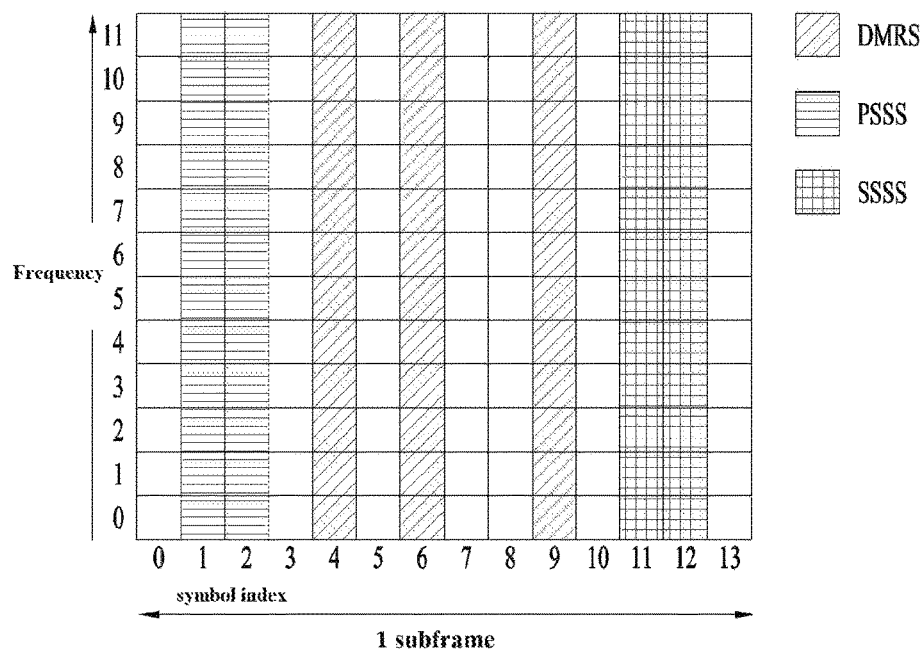

FIG. 23e shows three-symbol DMRS mapping according to a still further embodiment. The three-symbol DMRS mapping described with reference to FIGS. 23a to 23d may be combined with the synchronization signal mapping described with reference to FIGS. 19a to 22b. For example, synchronization signals may be mapped as shown in FIG. 19a. For instance, a PSSS may be mapped to OFDM symbols 1 and 2, and an SSSS may be mapped to OFDM symbols 11 and 12. Moreover, for instance, a DMRS may be mapped to OFDM symbols 4, 6, and 9 as shown in the DMRS mapping of FIG. 23c. Eventually, a reference signal (e.g., DMRS) and synchronization signals (e.g., PSSS and SSSS) may be mapped as shown in FIG. 23e.

The embodiments described with reference to FIGS. 23a to 23e can be applied to D2D communication and/or V2X communication. For example, the aforementioned reference signal and/or synchronization signal mapping can be applied to the PSBCH, but the invention is not limited thereto.

Figure 24:
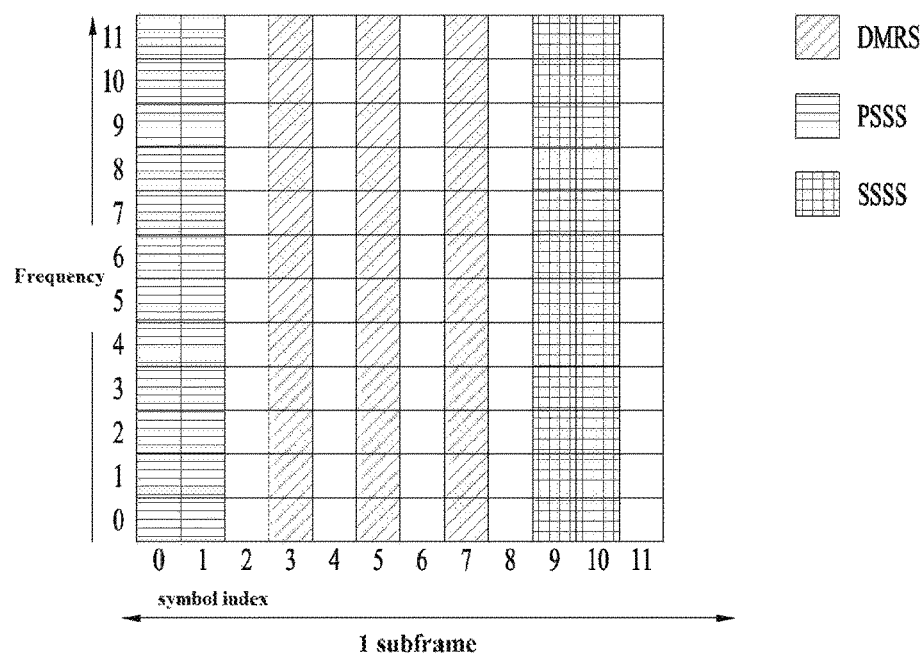
FIG. 24 illustrates three-symbol DMRS mapping in the case of an extended CP according to an embodiment of the present invention.

FIG. 24 illustrates three-symbol DMRS mapping in the case of an extended CP according to an embodiment of the present invention.

For example, a DMRS may be mapped to OFDM symbols 3, 5, and 7. In addition, a PSSS may be mapped to OFDM symbols 0 and 1, and an SSSS may be mapped to OFDM symbols 9 and 10. In this case, the DMRS may be mapped at the same interval.

Figure 25A:
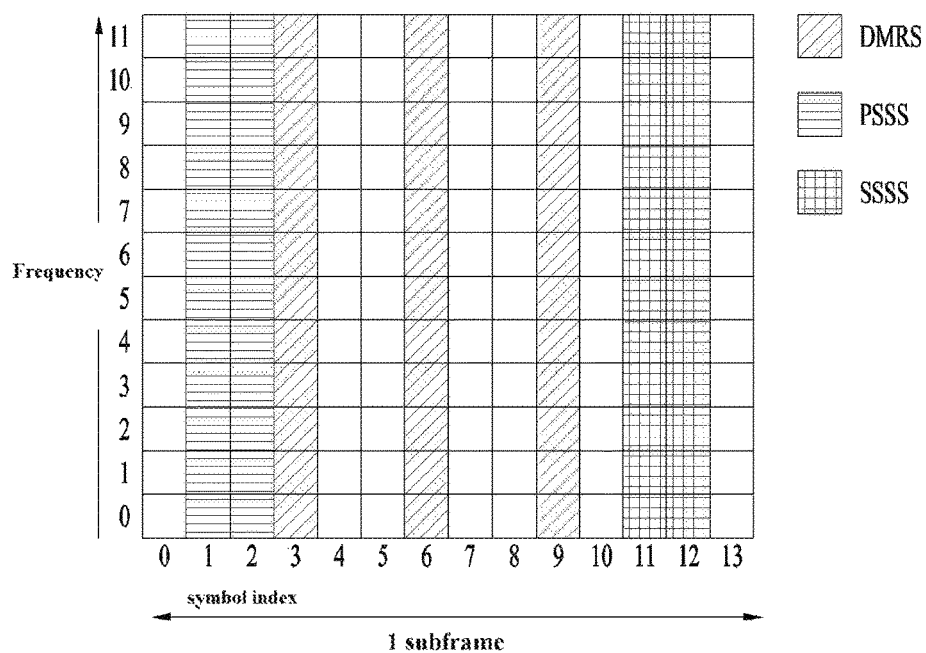
FIGS. 25a and 25b illustrate mapping of reference and synchronization signals according to an embodiment of the present invention.
Figure 25B:
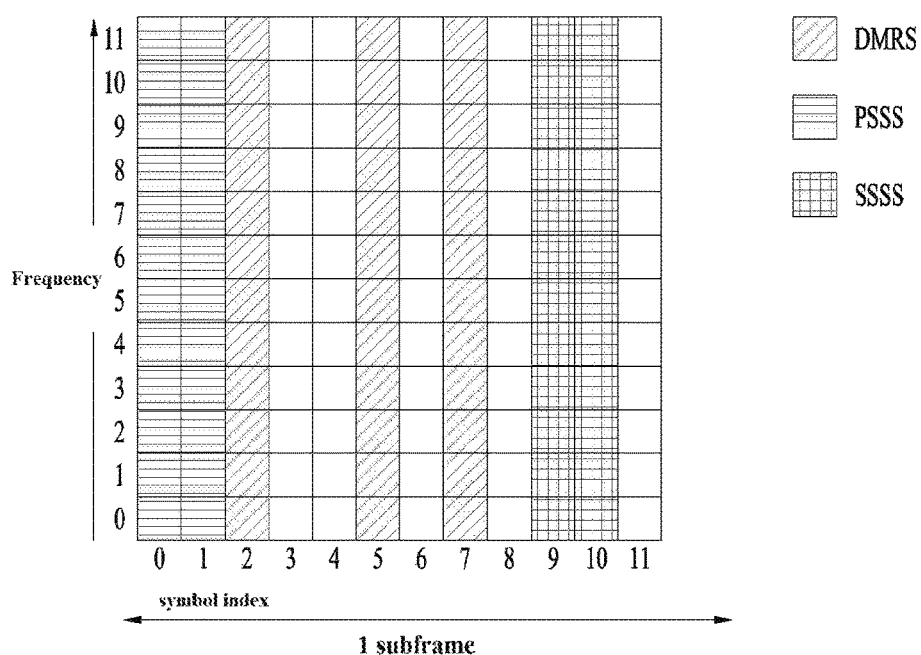

FIGS. 25a and 25b illustrate mapping of reference and synchronization signals according to an embodiment of the present invention.

Since an SSSS has relatively low transmit power as described above, a power transient time may occur due to the SSSS. For example, in the case of the normal CP, power transition may occur between the DMRS of OFDM symbol 10 and the SSSS of OFDM symbol 11 shown in FIG. 19a. In the case of the extended CP, power transition may occur between the DMRS of OFDM symbol 8 and the SSSS of OFDM symbol 9 shown in FIG. 19b. That is, a DMRS may be mapped such that distortion, which is caused by power transition, does not occur between a reference signal (i.e., DMRS) and SSSS.

As shown in FIG. 25a, in the case of the normal CP, a DMRS may be mapped to OFDM symbol 9 rather than OFDM symbol 10 for the frequency offset adjustment. That is, instead of mapping a DMRS to OFDM symbol 10 as shown in FIG. 19a, it may be mapped to OFDM symbol 9 as shown in FIG. 25a. In addition, referring to FIG. 25a, a one-symbol DMRS may be added to OFDM symbol 6.

As shown in FIG. 25b, in the case of the extended CP, a DMRS may be mapped to OFDM symbol 7 rather than OFDM symbol 8 for the frequency offset adjustment. That is, instead of mapping a DMRS to OFDM symbol 8 as shown in FIG. 19b, it may be mapped to OFDM symbol 7 as shown in FIG. 25b. In addition, for example, a one-symbol DMRS may be added to OFDM symbol 5 as shown in FIG. 25b.

As shown in FIGS. 19a to 25b, all twelve resource elements of each symbol where a DMRS will be mapped are occupied by the DMRS. However, for example, a comb type of DMRS mapping may be performed. For instance, a DMRS may be mapped to every two resource elements (REs). In this case, the DMRS may be mapped to REs corresponding to odd subcarrier indices (i.e., odd-numbered REs) or REs corresponding to even subcarrier indices (i.e., even-numbered REs). The comb type of even-RE mapping or odd-RE mapping may be determined in advance, or it can be changed on an OFDM symbol basis. For example, referring to FIG. 23c, a DMRS may be mapped to OFDM symbols 4, 6, and 9. In this case, the DMRS that will be mapped to OFDM symbols 4 and 9 may be mapped to even-numbered REs, and the DMRS that will be mapped to OFDM symbol 6 may be mapped to odd-numbered REs. On the contrary, the DMRS that will be mapped to OFDM symbols 4 and 9 may be mapped to odd-numbered REs, and the DMRS that will be mapped to OFDM symbol 6 may be mapped to even-numbered REs. Thus, in the case of the comb type of DMRS mapping, the even-RE mapping and odd-RE mapping can be alternately used. Therefore, in a frequency selective channel, channel estimation performance can be improved.

The above-described embodiments can be used in a specific manner That is, the aforementioned embodiments may be applied to only a specific band. For example, the embodiments may be applied to the band with a carrier frequency of 6 GHz. For example, if the carrier frequency is lower than a predetermined frequency, the reference signal mapping and/or physical format for the frequency offset adjustment according to the above embodiments may not be applied. On the contrary, when the carrier frequency is higher than the predetermined frequency, the reference signal mapping and/or physical format according to the above embodiments may be applied. This is because a large amount of the frequency offset may occur at the band with a high carrier frequency.

In addition, whether the above-described embodiments are applied can be determined based on types of transmitting/target UEs. For example, in the case of a vehicle UE, one of the aforementioned embodiments, i.e., specific DMRS mapping and/or physical format may be applied. In the case of a pedestrian UE, the DMRS mapping and physical format used for a D2D PSBCH may be applied. This is because since a vehicle UE has relatively higher speed than a pedestrian UE, the vehicle UE is more affected by the Doppler effect than the pedestrian UE.

For example, the above-described embodiments can be applied to the PSBCH for the V2X communication. However, when the PSBCH for the V2X communication is set to be different from that for the D2D communication, a receiving UE may experience confusion. For example, when receiving a PSBCH, a UE may not distinguish whether the corresponding PSBCH is for the D2D or V2X communication. In addition, for example, different PSBCHs may be configured for pedestrian and vehicle UEs. In this case, when receiving a PSBCH, a receiving UE may not distinguish whether the corresponding PSBCH is for either the pedestrian UE or vehicle UE. Thus, PSBCHs intended for other uses may be allocated to different resource regions. By doing so, a UE can determine the usage (e.g., D2D, V2X, vehicle, and/or pedestrian) of a specific PSBCH based on the resource region to which the PSBCH is allocated. The resource region to which the PSBCH is mapped may be previously configured or informed the UE through radio resource control (RRC) signaling. Hereinafter, a description will be given of sequences for DMRS transmission for the PSBCH of the V2X communication. In the current D2D communication, the convention uplink DMRS design is used for DMRS design. Details of the conventional uplink DMRS design can be found in clause 5.5 of 3GPP TR 36.211. Specifically, a base sequence, cyclic shift (CS), and orthogonal cover code (OCC) of the conventional uplink DMRS design are modified for the DMRS design for the D2D communication. More specifically, parameters are changed as shown in Table 5 below to design the PSBCH of the D2D communication. Four bits of a physical layer sidelink synchronization identity, $N_{ID}^{SL}$ are used for a base sequence, three bits are used for a CS, and one bit is used for an OCC.

TABLE 5

| Parameter in clause 5.5.2.1 (TR 36.211) | | PSBCH |
|---|---|---|
| Group hopping | | disabled |
| | $f_{ss}$ | $\lfloor N_{ID}^{SL}/16 \rfloor \bmod 30$ |
| Sequence hopping | | disabled |
| Cyclic shift | $n_{cs,\lambda}$ | $\lfloor N_{ID}^{SL}/2 \rfloor \bmod 8$ |
| Orthogonal sequence | $[w^\lambda(0)\ w^\lambda(1)]$ | [+1 +1] if $N_{ID}^{SL} \bmod 2 = 0$ |
| | | [+1 −1] if $N_{ID}^{SL} \bmod 2 = 1$ |
| Reference signal length | $M_{sc}^{RS}$ | $M_{sc}^{PSBCH}$ |
| Number of layers | $\upsilon$ | 1 |
| Number of antenna ports | P | 1 |

A UE may measure sidelink-reference signal received power (S-RSRP) by switching the value of $N_{ID}^{SL}$ (8 bits). In addition, the UE may perform synchronization using $N_{ID}^{SL}$ with high power. In this case, the UE may not use 8 bits of $N_{ID}^{SL}$. Thus, a CS or OCC having a fixed value may be used.

When the UE does not perform synchronization using a global navigation satellite system (GNSS), synchronization may be performed based on Table 5. Meanwhile, in this case, the UE may fail to distinguish between OCCs due to the frequency offset. Thus, an OCC with a fixed value may be used.

The current OCC for a two-symbol DMRS includes codes [1 1] and [1 −1]. Considering the frequency offset and Doppler effect, a DMRS may be mapped to a large number of symbols as described above. However, the current OCC is determined based on the DMRS mapped to two symbols. Thus, for example, when a DMRS mapped to three symbols is used, the existing OCC needs to be modified. In this case, the OCC for the three-symbol DMRS may be determined as follows.

First, a UE that intends to transmit a V2X message may not use an OCC or use a fixed OCC. For example, when a DMRS is mapped to four symbols, an OCC with the fixed value of [1, 1, 1, 1] may be used. For example, when a UE changes an OCC, a receiving UE may not recognize whether the OCC is changed or a channel is changed. As a result, the reception performance of the UE may be degraded. That is, to prevent the reception performance from being degraded, the OCC with a fixed value may be used, or an OCC may not be used.

Second, a UE that intends to transmit a V2X message may not apply an OCC or an OCC with a fixed value in one slot. For example, reference signals (e.g., DMRS) may be mapped to four symbols of one subframe. In this case, an OCC with the fixed value of [1, 1] or [1, −1] may be applied in the slot. In the case of adjacent reference signals in the slot, a channel change needs to be estimated accurately. Thus, the fixed OCC may be used in the slot to reduce uncertainty. According to the present method, a different OCC may be applied in each slot. For example, the OCC of [1, −1] may be applied to the first slot, and the OCC of [−1, 1] may be applied to the second slot. In addition, for example, a transmitting UE may inform another UE of its information using an OCC applied to each slot or a combination of OCCs. For instance, the value of the OCC applied to the second slot may indicate the information of the transmitting UE. For example, a pedestrian UE may use OCCs of [1, −1] and [−1, 1], and a vehicle UE may use OCCs of [1, −1] and [1, −1]. Thus, a receiving UE may determine a type of the transmitting UE based on the OCC applied to the second slot. Further, the OCC applied to the first slot may be used for transmitting the above-described information.

Third, an OCC may be applied to a UE that intends to transmit a V2X message. For example, a different OCC may be applied according to UE's movement speed or type. For example, if a UE moves at a predetermined speed or higher and another UE moves at the predetermined speed or lower, different OCCs may be applied to the two UEs. Specifically, an OCC for a pedestrian UE may be different from that for a vehicle UE. Moreover, although an OCC may be changed on a slot basis, the OCC may be changed in a slot. Thus, it is possible to transmit a large amount of information to a receiving UE based on OCCs.

Fourth, an OCC may be determined according to priority of V2X messages. For example, a different OCC value may be previously configured according to the priority of V2X messages. In addition, an event triggered message may have a different OCC value from that of a periodic message. For instance, an OCC may be differently configured according to the aforementioned first to third methods.

Fifth, for V2X message transmission, a comb type of DMRS mapping may be performed similar to that for a sounding reference signal (SRS). In this case, it is possible to information a receiving UE of specific information using comb indices. For example, the comb indices may be determined according to priority of a message, UE type, and/or UE mobility. For instance, whether a reference signal is mapped to even-numbered subcarriers or odd-numbered subcarriers may be indicated using the comb indices. In this case, although different messages overlap with each other, reference signals are distinguished with each other, and thus reception performance can be improved.

The aforementioned five methods can be combined. When at least one of the five methods is applied, synchronization (sync) sources can be distinguished for S-RSRP based on 16 (4-bit) base sequences and 8 (3-bit) CSs. When a UE measures S-RSRP, the UE may perform synchronization through a synchronization source with a combination with the highest value among combinations consisting of the base sequences and CSs. Moreover, the above-described five methods can be applied to the embodiments described with reference to FIGS. 19a to 25b.

Figure 26:
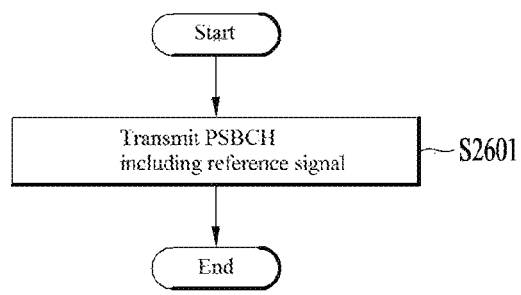
FIG. 26 is a flowchart illustrating a method for transmitting a reference signal according to an embodiment of the present invention.

FIG. 26 is a flowchart illustrating a method for transmitting a reference signal according to an embodiment of the present invention.

As shown in FIG. 26, a UE may transmit a PSBCH including a reference signal [S2601]. The UE may be a UE performing D2D or V2X communication. The PSBCH may include a reference signal and/or a synchronization signal. In this case, the reference signal may be a DMRS. In addition, the synchronization signal may include a PSSS and/or an SSSS. The reference signal and/or synchronization signal may be mapped according to the embodiments described above with reference to FIGS. 19a to 25b. Moreover, the embodiments of FIGS. 19a to 25b may be applied according to types of transmitting/target UEs or communication types. Further, various types of OCCs may be applied to a DMRS as described above with reference to Table 5.

Figure 27:
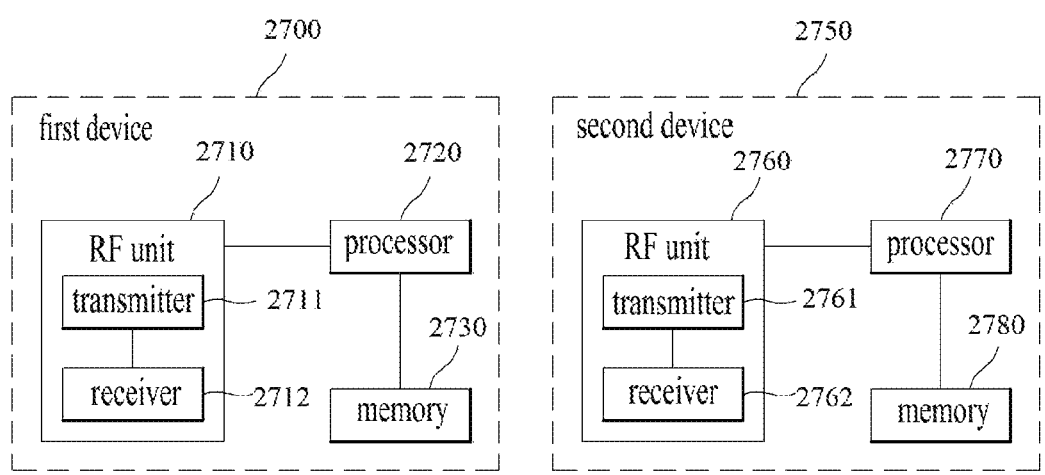
FIG. 27 is a schematic diagram illustrating devices according to an embodiment of the present invention.

FIG. 27 schematically illustrates configuration of devices to which the embodiments of the present invention illustrated in FIGS. 1 to 26 may be applied according to an embodiment of the present invention.

In FIG. 27, each of a first device 2700 and a second device 2750, which are D2D UEs, includes a radio frequency (RF) unit 2710, 2760, a processor 2720, 2770, and, optionally, a memory 2730, 2780. Although FIG. 27 shows configuration of two D2D UEs, a plurality of D2D UEs may establish a D2D communication environment.

Each of the RF unit 2730 and 2760 may include a transmitter 2711, 2761 and a receiver 2712, 2762. The transmitter 2711 and the receiver 2712 of the first device 2700 may be configured to transmit and receive signals to and from the second device 2750 and other D2D UEs, and the processor 2720 may be functionally connected to the transmitter 2711 and the receiver 2712 to control the transmitter 2711 and the receiver 2712 to transmit and receive signals to and from other devices. Meanwhile, the first device 2700 and/or the second device 2750 may be an eNB.

The processor 2720 may perform various kinds of processing on a signal to be transmitted, and then transmit the signal to the transmitter 2711, and process a signal received by the receiver 2712. If necessary, the processor 2720 may store, in the memory 2730, information contained in an exchanged message.

With the above-described structure, the first device 2700 may perform the methods of the various embodiments of the present invention described above. For example, each signal and/or message may be transmitted and received using a transmitter and/or receiver of the RF unit, and each operation may be performed under control of the processor.

Meanwhile, although not shown in FIG. 27, the first device 2700 may include various additional elements according to device application type. For example, if the first device 2700 is for intelligent metering, the first device 2700 may include an additional element for power measurement and the like. The operation of power measurement may be under control of the processor 2720 or a separately configured processor (not shown).

For example, the second device 2750 may be an eNB. In this case, the transmitter 2761 and receiver 2762 of the eNB may be configured to transmit and receive signals to and from other eNBs, D2D servers, D2D devices, and the processor 2770 may be functionally connected to the transmitter 2761 and receiver 2762 and may be configured to control the process of the transmitter 2761 and the receiver 2762 transmitting and receiving signals to and from other devices. In addition, the processor 2770 may perform various kinds of processing on a signal to be transmitted, transmit the signal to the transmitter 2761, and process a signal received by the receiver 2762. If necessary, the processor 2770 may store, in the memory 2730, information contained in an exchanged message. With the above-described structure, the eNB 2750 may perform the methods of the various embodiments described above.

In FIG. 27, the processors 2720 and 2770 of the first device 2710 and the second device 2750 respectively instruct operations for the first device 2710 and the second device 2750 (for example, control, adjustment, management, etc.). Each of the processors 2720 and 2770 may be connected to the memory 2730, 2780 that stores program code and data. The memories 2730 and 2780 may be connected to the processors 2720 and 2770 to store operating systems, applications, and general files.

The processors 2720 and 2770 of the present invention may be referred to as a controller, a microcontroller, a microprocessor, a microcomputer, or the like. Meanwhile, the processors 2720 and 2770 may be implemented by hardware, firmware, software, or a combination thereof. When embodiments of the present invention are implemented using hardware, the processors 2720 and 2770 may include application specific integrated circuits (ASICs), digital signal processors (DSPs), digital signal processing devices (DSPDs), programmable logic devices (PLDs), or field programmable gate arrays (FPGAs).

When embodiments of the present invention are implemented using firmware or software, the firmware or software may be configured to include modules, procedures, or functions that perform the functions or operations of the present invention. The firmware or software configured to implement the present invention may be provided within the processor or may be stored in the memory and driven by the processor.

The embodiments described above are constructed by combining elements and features of the present invention in a predetermined form. Each element or feature should be understood as optional unless explicitly mentioned otherwise. Each of the elements or features can be implemented without being combined with other elements. In addition, some elements and/or features may be combined to configure an embodiment of the present invention. The sequence of operations discussed in the embodiments of the present invention may be changed. Some elements or features of one embodiment may also be included in another embodiment, or may be replaced by corresponding elements or features of another embodiment. Claims that are not explicitly cited in each other in the appended claims may be combined to establish an embodiment of the present invention or be included in a new claim by subsequent amendment after the application is filed.

The present invention may be embodied in specific forms other than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein.

INDUSTRIAL APPLICABILITY

The aforementioned embodiments of the present invention can be applied to various mobile communication systems.

What is claimed is:

1. A method for transmitting a demodulation reference signal (DMRS) related to a physical sidelink broadcast channel (PSBCH) by a user equipment (UE) in a wireless communication system, the method comprising:
   obtaining a comb-index based on a mobility of the UE and a priority of a Vehicle to Everything (V2X) signal transmitted by the UE;
   mapping a primary sidelink synchronization signal (PSSS) to two consecutive symbols in a first slot of a subframe and a secondary sidelink synchronization signal (SSSS) to two consecutive symbols in a second slot of the subframe;
   mapping the DMRS to a first symbol and a second symbol in the first slot and to a third symbol in the second slot, wherein the DMRS is mapped to a part of subcarriers in the first, the second and the third symbols based on the comb-index; and
   transmitting the PSSS, the SSSS, the PSBCH and the DMRS in the subframe including 14 symbols,
   wherein each of the 14 symbols has normal cyclic prefix (CP),
   wherein the second symbol is located between the first symbol and the third symbol, and
   wherein the first symbol is located after one symbol interval from the two consecutive symbols in the first slot, and the third symbol is located before one symbol interval from the two consecutive symbols in the second slot.

2. The method of claim 1, wherein an index of the first symbol is 4 an index of the second symbol is 6 and an index of the third symbol is 9.

3. The method of claim 1,
   wherein indexes of the two consecutive symbols in the first slot are 1 and 2, and
   wherein indexes of the two consecutive symbols in the second slot are 11 and 12.

4. The method of claim 1, wherein a symbol having index 0 and a symbol having index 13 are used for automatic gain control (AGC) or Rx-Tx switching.

5. The method of claim 1, wherein the UE is included or placed in a vehicle.

6. A user equipment (UE) for transmitting a demodulation reference signal (DMRS) related to a physical sidelink broadcast channel (PSBCH) in a wireless communication system, the UE comprising:

a transceiver configured to transmit and receive a radio signal; and a processor configured to control the transceiver, wherein the processor is further configured to:

obtain a comb-index based on a mobility of the UE and a priority of a Vehicle to Everything (V2X) signal transmitted by the UE;

map a primary sidelink synchronization signal (PSSS) to two consecutive symbols in a first slot of a subframe and a secondary sidelink synchronization signal (SSSS) to two consecutive symbols in a second slot of the subframe;

map the DMRS to a first symbol and a second symbol in the first slot and to a third symbol in the second slot; and control the transceiver to transmit the PSSS, the SSSS, the PSBCH and the DMRS in the subframe including 14 symbols, wherein each of the 14 symbols has normal cyclic prefix (CP), wherein the second symbol is located between the first symbol and the third symbol, and wherein the first symbol is located after one symbol interval from the two consecutive symbols in the first slot, and the third symbol is located before one symbol interval from the two consecutive symbols in the second slot.

7. The UE of claim 6, wherein an index of the first symbol is 4, an index of the second symbol is 6 and an index of the third symbol is 9.

8. The UE of claim 6, wherein indexes of the two consecutive symbols in the first slot are 1 and 2, and wherein indexes of the two consecutive symbols in the second slot are 11 and 12.

9. The UE of claim 6, wherein a symbol having index 0 and a symbol having index 13 are used for automatic gain control (AGC) or Rx-Tx switching.

10. The UE of claim 6, wherein the UE is included or placed in a vehicle.

* * * * *